(12) United States Patent
Reznik

(10) Patent No.: US 9,744,659 B2
(45) Date of Patent: Aug. 29, 2017

(54) MATERIAL PROCESSING DEVICE AND METHOD

(71) Applicant: Shmuel Reznik, Tel-Aviv (IL)

(72) Inventor: Shmuel Reznik, Tel-Aviv (IL)

( * ) Notice: Subject to any disclaimer, the term of this patent is extended or adjusted under 35 U.S.C. 154(b) by 0 days.

(21) Appl. No.: 14/582,161

(22) Filed: Dec. 23, 2014

(65) Prior Publication Data

US 2015/0118008 A1  Apr. 30, 2015

Related U.S. Application Data

(63) Continuation of application No. PCT/IL2013/050533, filed on Jun. 23, 2013.

(60) Provisional application No. 61/690,580, filed on Jul. 2, 2012.

(30) Foreign Application Priority Data

Jun. 27, 2012 (IL) .......................................... 220671

(51) Int. Cl.
| | |
|---|---|
| *B23D 61/02* | (2006.01) |
| *B25F 5/00* | (2006.01) |
| *B27B 5/32* | (2006.01) |
| *F16D 7/02* | (2006.01) |

(52) U.S. Cl.
CPC ................ *B25F 5/001* (2013.01); *B27B 5/32* (2013.01); *F16D 7/024* (2013.01); *F16D 2300/12* (2013.01); *Y10T 29/4984* (2015.01)

(58) Field of Classification Search
CPC . B25F 5/001; B27B 5/32; F16D 7/024; F16D 2300/12; Y10T 29/4984

USPC ..... 464/45, 46; 83/571, 543, 698.41–698.61, 83/DIG. 1
See application file for complete search history.

(56) References Cited

U.S. PATENT DOCUMENTS

| | | | |
|---|---|---|---|
| 761,943 A * | 6/1904 | Brown .................... | F16D 7/025 464/45 |
| 2,156,047 A | 4/1939 | Arnold et al. | |
| 2,167,744 A | 8/1939 | Cosby et al. | |
| 2,726,524 A | 12/1955 | Gorin et al. | |

(Continued)

OTHER PUBLICATIONS

International Search Report (ISR) and Written Opinion (WO) dated Oct. 8, 2013 issued in International Application No. PCT/IL2013/050533.

*Primary Examiner* — Gregory Binda
(74) *Attorney, Agent, or Firm* — Holtz, Holtz & Volek PC

(57) ABSTRACT

An enhanced material-processing device and method are disclosed, having a processing tool of substantially circular circumference, which is operative with a power tool having a rotating spindle and jaws, which clamp the processing tool. The enhanced material-processing device has a central opening that is entered concentrically in the processing tool for receiving a clutch mechanism, and a hub structure. The hub structure is associated with the clutch mechanism to form a slip clutch that is integrally mounted in the enhanced material-processing device and is operative by application of an axial compression friction fit on the processing tool, which slips relative to the rotating spindle when a threshold torque limit is reached. The clutch mechanism is preloaded in axial compression through a predetermined elastic strain distance to provide a friction fit having a torque limit threshold, which torque limit of the slip clutch is controllably pre-adjustable.

17 Claims, 15 Drawing Sheets

(56) References Cited

U.S. PATENT DOCUMENTS

| | | | | |
|---|---|---|---|---|
| 2,822,657 | A | * | 2/1958 | Chaffee .................. A01D 34/63 464/45 |
| 4,205,572 | A | | 6/1980 | Weiner |
| 4,343,214 | A | * | 8/1982 | Schadlich .............. B23D 61/10 83/543 |
| 5,947,805 | A | * | 9/1999 | Van Osenbruggen ........ B24B 23/028 83/698.41 X |
| 2008/0196991 | A1 | * | 8/2008 | Eppard ................... F16D 65/18 |

* cited by examiner

MATERIAL PROCESSING DEVICE AND METHOD

CROSS REFERENCE TO RELATED APPLICATION

This application claims priority under 35 U.S.C. §119(e) of International Patent Application No. PCT/IL2013/050533 filed Jun. 23, 2013, the entire disclosure of which is incorporated by reference herein.

TECHNICAL FIELD

The embodiments of the invention relate to a substantially circular material-processing tool having a slip clutch integrally mounted and embedded therein to form an enhanced material-processing device to which rotation is provided by a power tool.

BACKGROUND ART

Rotary material processing machines, and in particular handheld power tools, for example for grinding and cutting, using fiber abrasive discs, or diamond on steel discs, or other available discs, present an operative challenge to operators, or users. FIG. 1 provides an example of an available material-processing tool mounted on a power tool. For the sake of nomenclature and ease of drawing, reference is made in the figures and in the text hereinbelow to a cutting disc, even though the embodiments of the present invention are not limited to such type of material processing tool but encompass processing tools such as discs or wheels or substantially flat tools like circular saws and discs, for cutting, grinding, polishing, and the like.

FIG. 1 illustrates an example of an existing, common standard off-the-shelf processing tool 19, or standard processing tool 19, such as a cutting disk 19 that is clamped by a clamping device or by clamping means 34, such as between the clamping jaws 34, or jaws 34, of a power tool 30, which is not shown in the FIGS. The power tool 30 has a spindle 32 on which are mounted a second-side jaw 34s and a first-side jaw 34f. The second-side jaw 34s is proximal to the power tool 30, and the first-side jaw 34f is distal therefrom. The second-side jaw 34s is coupled in rotational engagement with the spindle 32 and is configured to receive the standard material processing tool 19 thereon. The first-side jaw 34f may be supported by a nut, not shown, or be engaged by screw threads on the spindle 32, to close the jaws 34 against each other over the standard processing tool 19. Alternatively, and for the same purpose, the first-side jaw 34f may be configured as another fastening device, not shown in FIG. 1.

The standard off-the-shelf processing tool 19 has a central bore 25 that is centered on a jaw protrusion 35, which is disposed on the second side jaw 34s, and is thus concentric to the spindle 32. U.S. Pat. No. 2,156,047 to A. B. Arnold et al. recites a frictional driving connection for coupling a driving element to a driven element.

U.S. Pat. No. 2,167,744 to I. R. Cosby et al., discloses improvements for saw arbors for rotary or circular saws.

U.S. Pat. No. 2,726,524 to R. I. Weiner divulges a saw blade retainer and a kickback clutch assembly.

Since none of the patent cited hereinabove provides a clutch integrally embedded in the processing tool, it would be advantageous to provide such an option.

SUMMARY OF INVENTION

It is an object of the embodiments of the present invention to provide an enhanced material-processing device 60 including a processing tool 20 of substantially circular circumference operative with a power tool 30 having a rotating spindle 32, and clamps 34 for clamping the material processing device 60 therebetween. The enhanced material-processing device 60 comprises a central opening 20CB entered concentrically in the processing tool 20 for receiving a hub structure 14. Furthermore, the hub structure is coupled to the processing tool 20 to form a slip clutch 10 that is integrally embedded in the enhanced material-processing device 60 and is configured to slip relative to the rotating spindle 34 when a threshold torque limit is reached. The slip clutch 10 is preloaded in predetermined axial compression elastic strain deformation $\Delta t$ and is configured to apply a selected axial interference pressure fit on the processing tool 20.

It is still an object of the embodiments of the present invention to provide for the clamps 34 that are clamped on the processing device 60 to redress a loss or a discrepancy of predetermined axial pressure fit.

It is another object of the embodiments of the present invention to provide the hub structure 14 with a hub 40 that is configured to support at least one pressure ring 50P that is disposed coaxially therewith and with the processing tool 20. The at least one pressure ring 50P is disposed on one of a first side 22f, a second side 22s, and both sides of the processing tool 20, such that the at least one pressure ring 50P, the hub 40 and the processing tool 20 form a slip clutch 10 integrally embedded in the material processing device.

It is yet another object of the embodiments of the present invention to provide a hub structure 14 that is coaxial with the central opening 20CB of the processing tool 20. Furthermore, the at least one pressure ring 50P is disposed on one of a first side 22f, a second side 22s, and both sides of the processing tool 20. Thereby, the at least one pressure ring 50P, the hub 40 and the processing tool 20 form a slip clutch 10 integrally embedded in the processing tool.

It is still another object of the embodiments of the present invention to provide a hub structure that is configured to support at least one ring 50 that is selected from a group of rings including cover rings 50C, pressure rings 50P, friction rings 50F, jacket rings 50J, hub rings 50H, shim rings 50SH, and combination rings 50K. The at least one ring 50 is concentric to the hub 40 and is disposed on one of a first side 22f, a second side 22s, and both sides of the processing tool 20.

It is yet still another object of the embodiments of the present invention to provide an enhanced material-processing device wherein the at least one pressure ring 50P is fixedly attached to at least one of the hub 40, the processing tool 20, and a ring 50 selected out of the group of rings. Alternatively, the at least one pressure ring 50P may be coupled in rotational engagement with the hub 40.

It is also another object of the embodiments of the present invention to provide at least one pressure ring 50P that is preloaded to apply a predetermined axial pressure fit on the processing tool 20.

It is additionally another object of the embodiments of the present invention to provide a hub structure 14 that is configured to support at least one shim ring 50SH.

It is an additional object of the embodiments of the present invention to provide at least one cover ring 50C that is fixedly coupled to the hub 40, and where the hub structure 14 supports one of both: a cover ring operative as a pressure ring 50P, and a couple of cover rings configured to compress the processing tool 20 therebetween.

It is yet an additional object of the embodiments of the present invention to provide an enhanced material-processing device 60 operative with a power tool 30 having a rotating spindle 32 that retains and rotates a processing tool 20 of substantially circular circumference. The enhanced material-processing device 60 has a central opening 20CB entered concentrically in the processing tool 20, and a hub structure 14 configured to be disposed in the central opening 20CB and coupled to the processing tool 20 in integral embedment therein.

It is still an additional object of the embodiments of the present invention to provide a hub structure 14 that is configured to support at least one ring 50 disposed in concentricity therewith and with the processing tool 20. The at least one ring 50 is selected alone and in combination from a group of rings including cover rings 50C, pressure rings 50P, friction rings 50F, jacket rings 50J, shim rings 50HS, hub rings 50H and combinations rings 50K. Furthermore, the at least one ring 50 is disposed on one of a first side 22f, a second side 22s, and both sides of the processing tool 20.

It is a further object of the embodiments of the present invention to provide a method for implementing a slip clutch 10 that is integrally embedded in an enhanced material-processing device 60 including a processing tool 20 of substantially circular circumference operating with a power tool 30 having a rotating spindle 32 and clamps 34 for clamping the enhanced material-processing device therebetween. The method includes the steps of providing a concentric central opening 20CB in the processing tool 20 for receiving a slip clutch, forming the clutch mechanism by providing a hub structure 14 disposed in the central opening and applying a predetermined axial compression friction fit on the material processing device 60, and allowing the processing tool 20 to slip relative to the rotating spindle 34 when reaching a threshold torque limit.

It is yet still a further object of the embodiments of the present invention to provide a clutch mechanism 12 that preloads the material processing device 60 in axial compression through a predetermined elastic strain distance Δt to provide a friction fit.

It is yet still another object of the embodiments of the present invention to provide a hub 40 that is configured for supporting at least one pressure ring 50P disposed in concentricity therewith and with the processing tool 20, where at least one pressure ring 50P is disposed on one of a first side 22f, a second side 22s, and both sides of the processing tool 20. Thereby, the at least one pressure ring 50P, the hub 40 and the processing tool 20 form a slip clutch 10 integrally embedded in the enhanced material-processing device 60.

It is still yet a further object of the embodiments of the present invention to provide at least one ring 50 selected from a group of rings including cover rings 50C, pressure rings 50C, friction rings 50F, jacket rings 50J, shim ring 50SH, and combination rings 50K, and to dispose the at least one ring 50 in concentricity with the hub 40 on one of a first side 22f, a second side 22s, and both sides of the processing tool 20.

It is still one more further object of the embodiments of the present invention to provide clamps 34 are clamped on the processing device 60 to redress a loss of predetermined axial pressure fit.

It is still a further object of the embodiments of the present invention to provide an enhanced material-processing device 60 that is operative with a power tool 30 in the same manner as a standard processing tool 19. This means that the user mounts and uses the enhanced material-processing device 60 on a power tool 30 in the same manner as a standard processing tool 19.

It is yet still a further object of the embodiments of the present invention to provide at least one of a pressure ring 50P, a friction ring 50F, a jacket ring 50J, and combination ring 50K, that is coupled in rotational engagement with the hub 40 and allows axial displacement relative thereto.

Technical Problem

In practice, operators using cutting wheels or discs may encounter difficulties, for example when the angle of attack between the cutting wheel and the cut, or processed material, is altered, and in case the shape of the object and of the material cut by the cutting wheel changes. As a result thereof, there may occur events such as seizure of the processing tool in the processed material, loss of control of the power tool, backslash, and processing tool or work piece breakdown. Such events may even be dangerous and possibly fatal to the operator, and to a lesser degree, may cause overload of the machine, and lead to premature failure of both machine and cutting media. Hence, and especially so for handheld machines, the common approach of providing a rigid power transfer from the machine or power tool 30 to the cutting tool, is far from being ideal.

Therefore, clutches, torque limiters, and various types of overload protection devices mounted into power tools or power machines have been proposed. The limited success encountered by such machine-mounted clutches may be due to the narrow range of compatibility between the one specific clutch, which is dedicated to a particular purpose, versus the versatility of use of different processing tools that may be mounted on the same power tool. One power tool may accommodate many types of material processing cutting or other discs, which are made of various material sizes and shape, rotating in a range of cutting speeds, and operative on different types of workpieces.

It would therefore be advantageous to provide an enhanced material-processing device having a slip clutch integrally incorporated therein. The slip clutch should be simple to produce, and may but marginally add to the cost and to the mass of inertia of the material processing tool. The slip clutch may be calibrated to let the processing tool slip when a specific predetermined torque limit or threshold torque is reached. When slipping starts, power transfer from the spindle 32 to the desired and enhanced material-processing tool should diminish, and the rotational speed of the material-processing tool should slow down relative to the spindle. Slowdown may extend over a span of diminishing rotational speeds, whereafter, according to circumstances, full and undiminished power transfer should recover or else, the material-processing tool should stop to rotate.

Solution to Problem

The solution of the problem is achieved by integrally incorporating and embedding a slip clutch 10, having a predetermined torque threshold limit, on a material processing tool 20, which is a slightly modified standard processing tool 19, to form an enhanced material-processing device 60.

As shown in FIG. 1B, the jaws 34 of the power tool 30, which is not shown, are rotated by the spindle 32, and apply a sufficient axial clamping force perpendicular to the center portion 21 of a rotating processing tool 20 to prevent slippage thereof while in use. The spindle 32 defines an axial direction. The perpendicular clamping force is a normal force, which is applied by the jaws 34, or by an equivalent thereof, on the surface of the processing tool 20, or disc. The clamping force is superior to and exceeds the maximal arresting force or process force encountered by and applied on the processing tool during the actual processing of a workpiece.

In general, slippage of the processing tool 20 may be dependent on the normal force, on the effective radius of the jaws 34, and on the coefficient of friction μ of the jaws on the substantially circular surface of the processing tool. Slippage of the processing tool 20 relative to the spindle 32 may thus be intentionally made to occur, for example, when the counter-torque caused by the forces necessary for processing the material of the workpiece exceed the multiplication of the normal force applied on the processing tool, times the coefficient of friction μ of the jaws 34 on the enhanced material processing device 60, times the effective radius.

For the jaws 34 of a given power tool 30, and for a given processing tool 20, the two parameters, namely the effective radius of the jaws and the coefficient of friction μ have a predetermined value that a user, not shown, may accept as being given. However, the normal force of closure of the jaws 34 on the processing tool may be controlled and become a predetermined parameter. It is the user himself who closes the jaws 34 of the power tool 30 and thereby applies the normal force on the processing tool 20. Evidently, calling on the user to determine and control the normal force that has to be applied on the processing tool 20 is an impractical request.

Radial friction fits, also referred to as radial pressure fits or radial interference fits, are well known with respect to press-fitting of shafts into bearings, or of bearings into their respective housings. Similarly to radial friction fits, the axial pressure of the jaws 34 on the material processing tool 20 may be regarded as an axial interference fit, or pressure fit, or friction fit, where the jaws 34 rotate in concert with the processing tool. The axial pressure fit may be appropriately calibrated to provide a certain degree of interference fit between the jaws 34 and the processing tool. Such degree of interference may be sufficient to permit slip, thus a diminishing and slowing down of rotation, or sometimes full slip, thus no rotation of the processing tool 20 relative to the rotation of the spindle 32. Slip occurs when a predetermined threshold torque or limit torque is reached. Just like radial friction fits, axial friction fits rely on the compressive elastic stress and strain, thus on the modulus of elasticity of the materials of the associated machine parts.

FIGS. 1A and 1B depict a schematic partial cross-section of an exemplary embodiment 1 of an enhanced material-processing device 60 wherein a circular central opening 20CB houses a basic slip clutch 10. This means that for example, the central bore 25 of a standard off-the-shelf processing tool 19 has been enlarged into a circular central opening 20CB having a predetermined larger diameter, to form a processing tool 20. The difference between the standard processing tool 19 and the material-processing tool 20 is the enlarged central opening 20CB. The enhanced material-processing device 60 is shown in FIG. 1A before clamping of the jaws 34 on the processing tool 20, and in FIG. 1B after clamping thereof and ready for use.

FIG. 1A illustrates an enhanced material-processing device 60 having a processing tool 20 and a hub structure 14 with a hub 40 forming a basic slip clutch 10, as well as the two jaws 34, namely a first-side jaw 34f and a second-side jaw 34s, and a spindle 32. The spindle 32 pertains to a power tool 30, not shown, that rotates the jaws 34. The processing disc 20, or processing tool 20, has a processing tool first side 22f and a processing tool second side 22s that is supported by the second-side jaw 34s, which also supports the hub second side 40s of the hub 40.

The hub structure 14 may be configured as a sleeve 40, or hub 40, made out of rigid material, shown in detail in FIG. 1C. The hub 40 has an interior diameter 40id and an exterior diameter 40od. The interior diameter 40id is larger than the exterior diameter of the spindle 32, which passes therethrough. The exterior diameter 40od is rotatably retained to the processing tool 20 but in slight retention fit. This means that the hub 40 may be introduced and retained into the enlarged central opening 20CB such that rotation will be allowed. The hub 40, which forms the slip clutch 10 is thereby integrally embedded in the processing tool 20. The hub 40 has a hub thickness Ht that is smaller by Δt than the thickness 20t of the processing tool 20. It is noted that the FIGS. are not to scale, and so is the pressure fit distance Δt.

FIG. 1B illustrates a disposition where the jaws 34 forcefully clamp the processing tool 20, ready for workpiece processing operation. The jaws 34 are compressed onto the processing tool 20 until arrested by the hub 40. The deformation Δt is a predetermined axial compression and elastic strain deformation, which is calibrated to provide a selected predetermined axial friction fit, or axial interference fit, or axial pressure fit, on the processing tool 20, sufficient for the jaws 34 to rotate the processing tool for workpiece processing operations. The spindle 32 defines the axial direction. A calibrated axial pressure fit means that when the processing tool 20 encounters a predetermined threshold torque, or limit torque, the jaws 34 may allow slippage of rotation of the processing tool 20 relative to the rotating spindle 32, thus at least lowering the speed of the processing tool.

To this end, the hub 40 is provided with a predetermined hub thickness Ht that is configured to arrest the jaws 34 during axial compression in elastic strain deformation of the processing tool 20. The hub 40, the processing tool 20, and the jaws 34 form a clutch mechanism 12. Thereby, there is provided a slip-clutch 10, which is embedded into and integral with the processing tool 20 and forms therewith an enhanced material-processing device 60.

In brief, the jaws 34 may apply an axial compression elastic strain deformation Δt on the processing tool 20 to create an axial pressure fit. The enhanced material-processing device 60 supports a hub structure 14 that is associated with a clutch mechanism 12 to form a slip clutch 10. The slip clutch 10 may be integrally mounted and embedded in the enhanced material-processing device 60 and be operative by application thereon of an axial compression friction fit. The slip clutch 10 permits slippage of the processing tool 20 relative to the rotating spindle 32. Total arrest of the processing tool 20 may also occur.

For workpiece processing operation, a user, not shown, may clamp a processing tool 20 between the jaws 34, until the processing tool 20 is compressed through the predetermined elastic strain deformation Δt. This means that the jaws 34 are arrested and seated on the calibrated thickness Ht of the hub 40. At that stage, the processing tool 20 is compressed in predetermined and calibrated axial friction, interference fit, or pressure fit, such that the jaws 34 may rotate the processing tool for material processing operations. However, should the processing tool 20 encounter a predetermined threshold torque limit, then the processing tool may slip to a lower rotation speed relative to the rotation speed of the spindle 32 and of the jaws 34, to prevent a mishap to the user, or an overload to the power tool 30, or both. The operation of the slip clutch 10 may reduce the rotation of the processing tool 20, which may slow down and come near to or even to full rotational arrest. However, after slow down, slippage may cease and the processing tool 20 may recover rotational speed and return to accept full power transfer from the spindle 32. This means that the operation of the slip clutch 10 is reversible.

The hub structure 14 and the processing tool 20 form an enhanced material-processing device 60 that is operative with a power tool 30 having a rotating spindle 32 and jaws 34 between which is compressed the processing tool that may be of substantially circular circumference.

FIG. 1D illustrates a partial cross-section of one of possible alternative embodiments 2 of the hub structure 14, which may be configured as a hub 40 made out of a plurality of concentric hub sleeves. For example, FIG. 1D shows two hub sleeves disposed in mutual radial interference fit, namely a first hub sleeve 40A and a second hub sleeve 40B. This means that the hub structure 14 may be configured as either one unitary piece of material or as a plurality of pieces of material. The exterior diameter 40od of the hub structure 14 is configured to allow rotation relative to the interior diameter of the central opening 20CB of the processing tool 20, but may be retained therein in slight retention fit. The interior diameter 40id may be configured to allow passage therethrough in free rotational fit, of the spindle 32. The first and the second hub sleeves, respectively 40A and 40B, together with the clamps 34 and the processing tool 20 form the clutch mechanism 12 of the slip clutch 10.

As still another embodiment, shown in FIG. 4C, the hub structure 14 may be configured as a hub 40 made out of more than two concentric hub sleeves.

It is noted that the coefficient of friction μ such as that of the jaws 34 on the enhanced material processing device 60 for example, does not have a discrete value but covers a range of values, and therefore, the threshold torque limit too, does also covers a range of values. The wording "coefficient of friction μ" and "threshold torque limit" refer to a distribution covering a span of values, but are related to in the present description as representing a discrete value, which is true for practical purposes with the embodiments of the present invention.

The solution of the problem described hereinabove may thus be embodied by the provision of a lightweight slip-clutch 10, or torque limiter 10, which is coupled to and may be integrally embedded in the material cutting or material-processing tool 20. Such a slip clutch 10 may be specifically adapted and dedicated to the operational capabilities of a definite type of processing tool 20 and/or to the task at hand, to form an enhanced material-processing device 60.

Advantageous Effects of Invention

The combination of a slip clutch 10 that is integrated and embedded in a processing tool 20 to form an enhanced material-processing device 60 has also surprisingly resulted in a longer lifespan of the processing tool itself. In addition, the enhanced material-processing device 60 practically allows a workpiece processing procedure that is continuous, without interruption of the work: There is no need to restart the power tool 30 or to retrieve a stuck enhanced material-processing device 60 out of the workpiece. Evidently, the lifetime of the slip clutch 10 may be designed to equal or to exceed the lifetime of the processing tool 20.

Furthermore, should there be made available a power tool 30 with a built-in torque limiter, then that torque limiter will have a specific nominal slip value. In contrast thereto, various enhanced material-processing devices 60 may provide a span of slip values: each one enhanced material-processing device 60 may be produced with a different specific slip value, such that a user may select an enhanced material-processing device 60 that is best adapted to the task at hand. Evidently, an enhanced material-processing device 60 allows the use of a less expensive power tool 30, such a one that is not equipped with a torque limiter.

The disposition of a lightweight slip clutch 10 at the very end of the drive train of the power tool 30 minimizes the time of both the braking and the acceleration of the processing tool 20. A power tool 30 with a built-in torque limiter has rotating elements presenting a significant inertia of mass, whereas practically, with the lightweight enhanced material-processing device 60, there is but the inertia of mass of the processing tool 20.

Fast acceleration and short braking time of the enhanced material-processing device 60 are not only safety measures, but also provide better traction, smooth cutting or processing, and a wider ability of selection of the cutting angle of attack to prevent seizure of the processing tool 20 such as seizure due to collapse of the workpiece. Such features are especially important with workpieces made out of non-homogenous material and with workpieces having various thickness and/or irregular shape.

In addition, the avoidance of frequent successive and sudden arrest-shocks on the processing tool 20, sometimes known as "slip-stick" or "jerking", has resulted in reduced tool wear and better control of the processing tool, particularly when hand-held.

Lastly, the simplicity of design of the clutch assembly 10 features easily implemented and straightforward automatic radial assembly of the inexpensive elements of the enhanced material-processing device 60.

BRIEF DESCRIPTION OF DRAWINGS

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements, or parts that appear in more than one figure are preferably labeled with a same or similar reference sign or number in all the figures in which they appear, in which.

DESCRIPTION OF EMBODIMENTS

Figure 1:
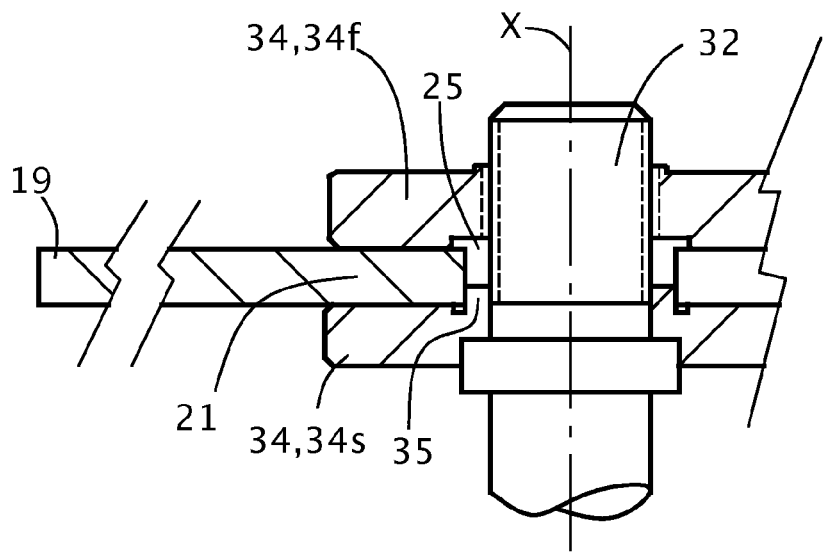
FIG. 1 shows a prior art material processing tool mounted on a power tool.
Figure 1A:
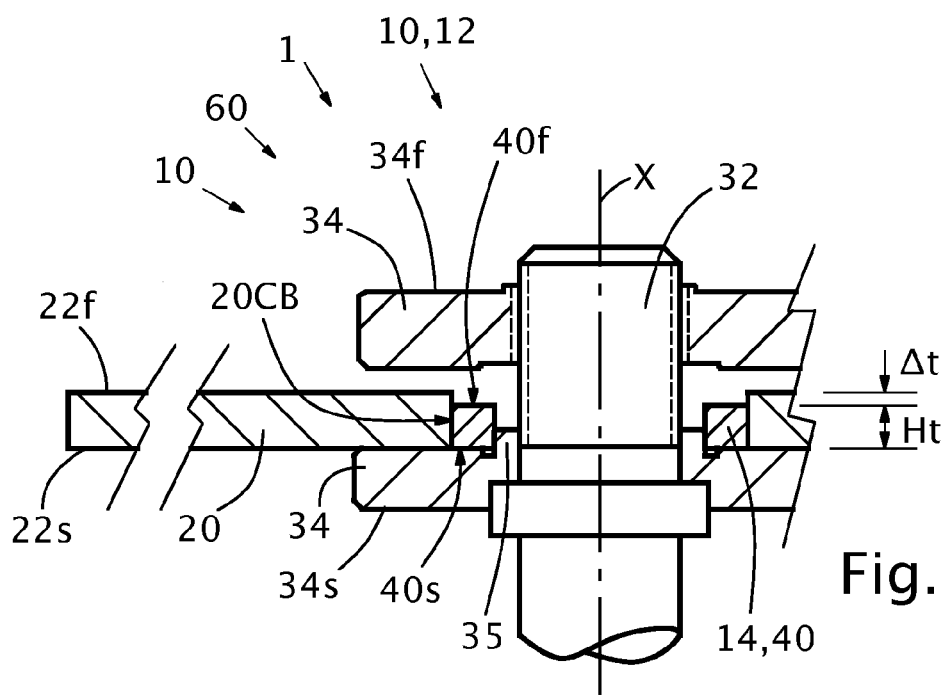
FIGS. 1A and 1B illustrate a basic slip clutch.
Figure 1B:
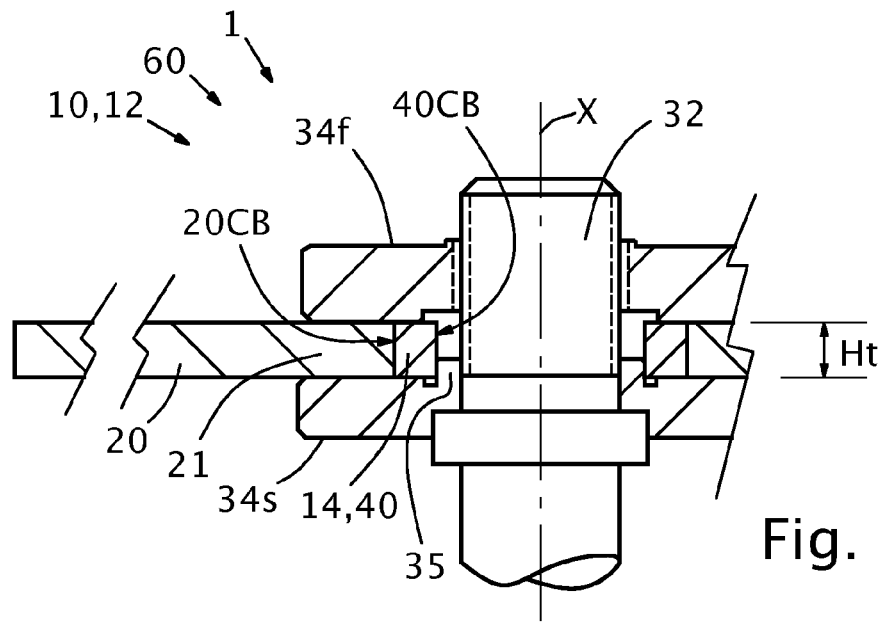
Figure 1C:
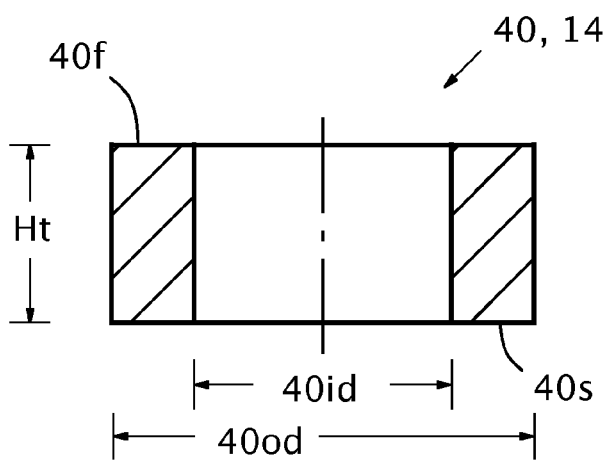
FIGS. 1C and 1D depict details of hubs for a slip clutch.
Figure 1D:
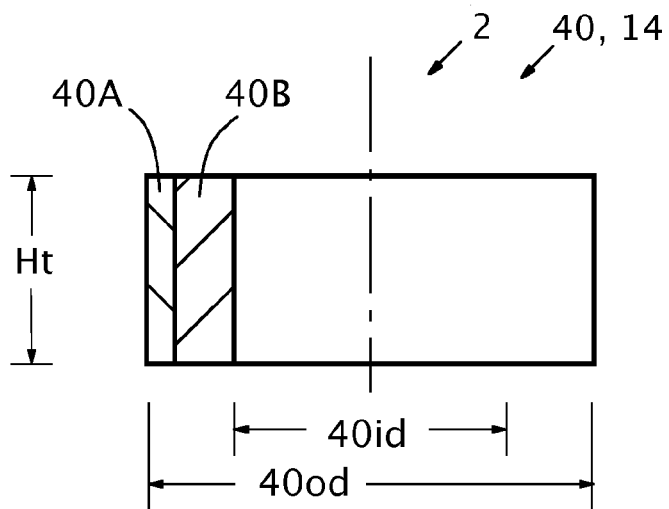

The exemplary embodiments described hereinabove and hereinbelow are applicable to processing tool 20 that may be selected for example not only as cutting tools, such as cutting disks, but also as circular saw blades, or grinding wheels, or lapping, cleaning, or substance administering tools. Likewise, the power tool 30 for use of the embodiments of the present invention may be selected as a handheld, hand-driven, automatic, or stationary machine made for various tasks, but not shown in the FIGS.

For the sake of reference, items are indicated in the description and in the FIGS. by reference signs or reference numerals, independently of their emplacement relative to a side of the processing tool 20. Items that are disposed on the side of the processing tool first side 22f may have a reference sign that carries the suffix f while when disposed on the side of the processing tool second side 22s, may have a reference sign that carries the suffix s.

Figure 8:
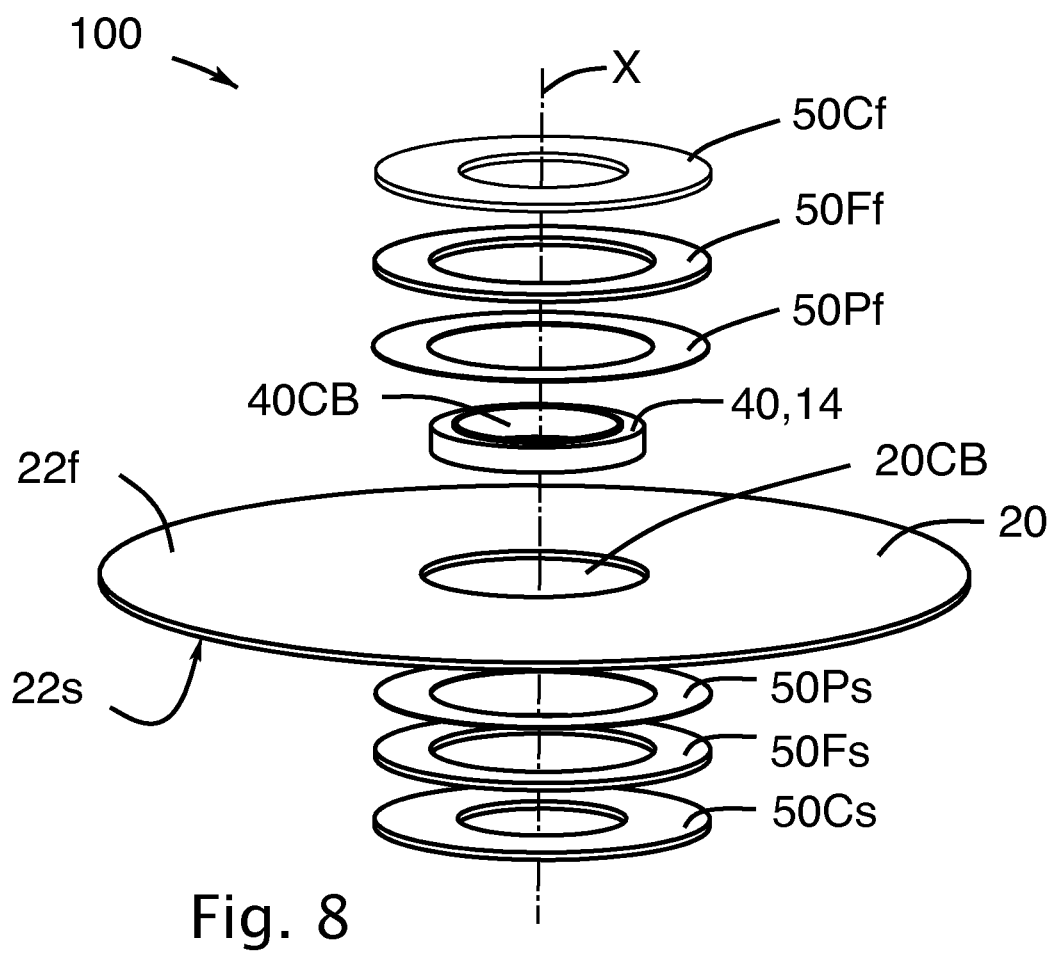

The enhanced material-processing device 60, or processing device 60 for short, may thus be mounted on a power tool 30, which is not shown, having a spindle 32 and a clamping device or clamping means such as two jaws 34 for example. The processing tool 20 may be clamped between the two jaws 34, namely a first-side jaw 34f and a second-side jaw 34s. The spindle 32 imparts rotation to the processing tool 20 via the jaws 34, in a plane perpendicular to the spindle. The axis X of the spindle, shown in FIG. 8, is disposed perpendicular to the processing tool 20 and defines an axial direction.

The exemplary embodiments described hereinbelow illustrate various enhanced material-processing devices 60 having a torque limiter 10, or slip clutch 10, which is integrated and embedded into a slightly modified substantially circular material-processing tool 20. In other words, the substantially circular enhanced-material processing device 60 includes a material-processing tool 20 having therein an integrally embedded slip clutch 10 operating a clutch mechanism 12. The material processing tool 20, or processing tool 20, has a central opening 20CB and two processing tool sides 22, namely a processing tool first side 22f and a processing tool second side 22s. The central opening 20CB is provided with an enlarged interior diameter.

For the sake of ease of description and for clarity of the drawings, reference is made hereinbelow and in the drawings to a processing tool 20 such as a cutting disc that is mounted on a handheld power tool 30.

Embodiment 100

Figure 2:
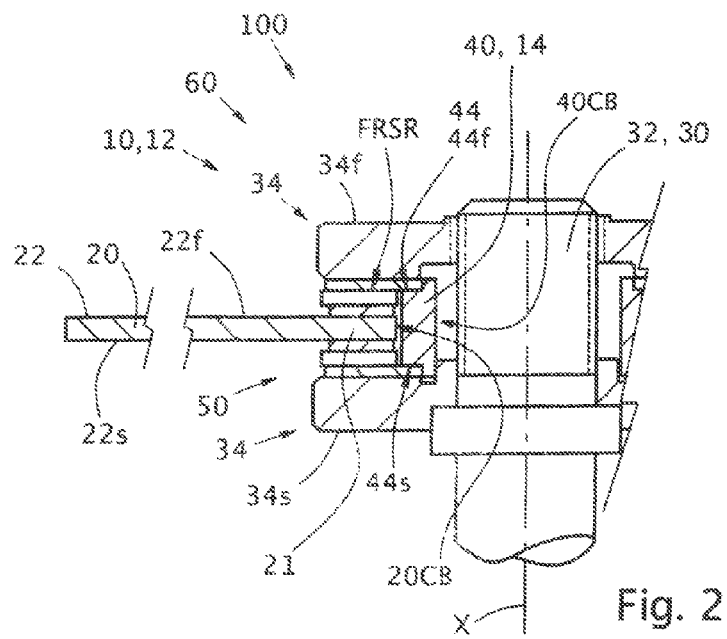
FIGS. 2 and 3 illustrate an embodiment 100.
Figure 3:
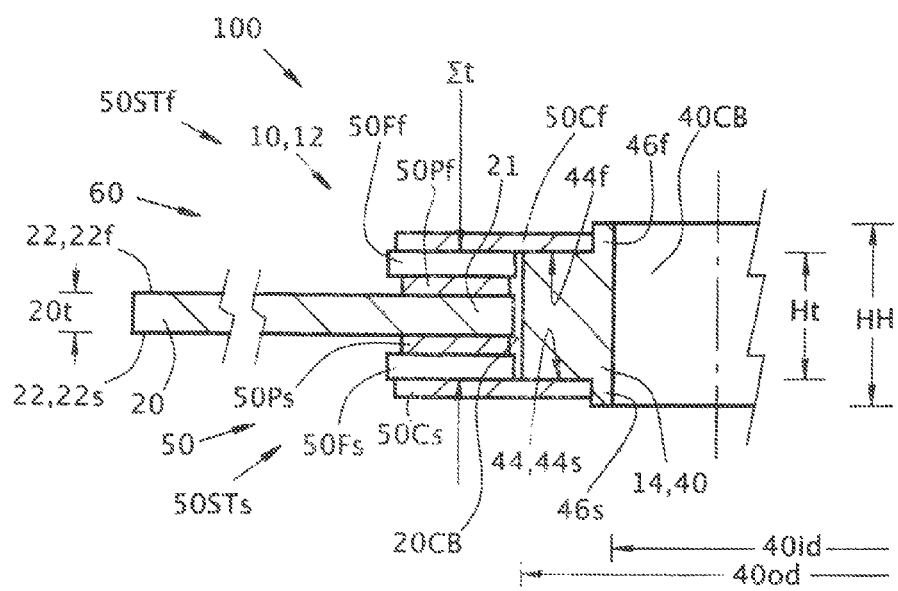

FIGS. 2 and 3 show a partial cross-section of an embodiment 100 of an exemplary enhanced material-processing device 60 having a slip clutch 10 integrally embedded therein. The enhanced material-processing device 60 includes a hub structure 14 with a hub 40, and a plurality of rings 50, where the processing tool 20, the hub structure, and the rings form the clutch mechanism 12. The plurality of rings 50 may be packed in close coaxial abutment in parallel to each other, may be coaxial with the spindle 32, and may be supported by the hub structure 14, and/or by the hub 40, in concentricity with the processing tool 20. The clutch mechanism 12, or at least portions thereof, may pass through the central opening 20CB of the processing tool 20, as described hereinbelow, and be integrally embedded in the enhanced material-processing device 60.

The slip clutch 10 is implemented by the application of a predetermined level of axial interference fit, or axial pressure fit forces, on the processing tool 20. The axial pressure fit may be selected to be tight enough to permit rotation of the processing tool 20 for workpiece processing, but may be applied such that above a predetermined torque threshold limit, the processing tool will slip relative to the rotating spindle 32.

The predetermined axial pressure fit may be provided by use of one or more compressed elastic and resilient pressure rings 50P that preload, thus apply pressure forces on the processing tool 20. This means that the slip clutch 10 may use one or more resilient pressure rings 50P that have a free thickness before assembly, but may be axially compressed during final assembly through a precisely determined compression in elastic strain deformation $\Delta t$ to apply the desired slip clutch 10. Actually, a pressure ring 50P may be considered as a compression spring that is axially loaded through the predetermined elastic strain deformation distance $\Delta t$, to provide, in response, the desired friction fit force on the processing tool 20.

Practically, the pressure rings 50P may be compressible, but this is not necessarily so with other rings 50 that are a not pressure rings. Alternatively, the compressibility of the other rings 50, e.g. cover rings 50C, friction rings 50F, and further types of rings described hereinbelow, for example jacket rings 50J, hub ring 50H, and combination rings 50K, may also be taken in consideration to achieve the desired predetermined elastic strain deformation distance $\Delta t$. A combination ring 50K combines at least two out of the cover rings 50C, pressure rings 50P, and friction rings 50F.

The hub structure 14, or the hub 40, may be configured according to the selected compression-fit deformation $\Delta t$. To this end, the hub 40 may be provided with arresting surfaces 44, or support surfaces 44 that ensure accurate preload when one or more elements of the clutch mechanism 12 are properly seated thereon. Once preloaded as predetermined for providing the desired axial press fit on the processing tool 20 and on the ring(s) 50, the hub structure 14 may be kept in the preloaded state to form the enhanced material-processing device 60.

However, the axial compression exerted on the pressure ring(s) 50P during final assembly, or relaxation of the pressure after assembly, may provide but a portion of the desired axial compression. Upon mounting of the processing tool 20 on the power tool 30, the clamping jaws 34 may add the final pressure forces to fully achieve the desired predetermined interference fit deformation $\Delta t$.

Figure 4:
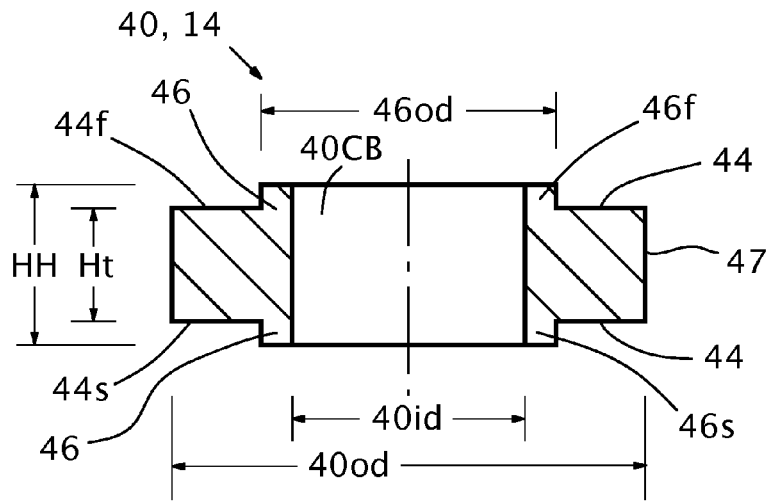
FIGS. 4, 4A, 4B, 4C, and 5 to 8 show details of the embodiment 100.

To obtain a fine-tuned torque limiter, or a slip clutch 10 having a narrow-range threshold slip, a precise axial compression interference fit elastic strain deformation $\Delta t$ of the pressure rings 50P may be required. In turn, for ease of manufacture, the selected strain deformation $\Delta t$ for the assembly of an embodiment may be provided as the distance separating the flat seating surfaces 44 that are disposed on the hub 40, as shown in FIG. 4. The distance that separates apart the flat seating surfaces 44 is referred to as the distance Ht.

As depicted in FIGS. 2 and 3, the hub 40 is disposed concentrically in and through the central opening 20CB of the processing tool 20, and may protrude out of and away from both sides 22 thereof, or at least out and away from one of both sides of the processing tool. The hub 40, also shown in one configuration in FIG. 4, has a hub central opening 40CB defining a hub interior diameter 40id wherethrough passes the spindle 32, which has a smaller exterior diameter, and has an exterior diameter 40od. The hub exterior surface 47 delimits the exterior diameter 40od.

As best seen in FIG. 4, two step-like peripherally circular recesses may form parallel circular hub flats 44, namely a first-side circular flat 44f and a second-side circular flat 44s, that are disposed in planes parallel and concentric to, respectively, the first side 22f and to the second side 22s of the processing tool 20. The distance separating both circular flats 44 apart from each other defines the hub thickness Ht, which is associated with the compression fit Δt. Two circular hub protrusions 46, namely a first-side hub protrusion 46f and a second-side hub protrusion 46s, delimit the respective circular flats 44 and prevent their extension up to the hub central opening 40CB. The two circular hub protrusions 46 have a hub protrusion exterior diameter 46od and a hub protrusion interior diameter 40id, which is the diameter of the hub central opening 40CB. The total height of the hub 40 is indicated as HH.

Figure 4A:
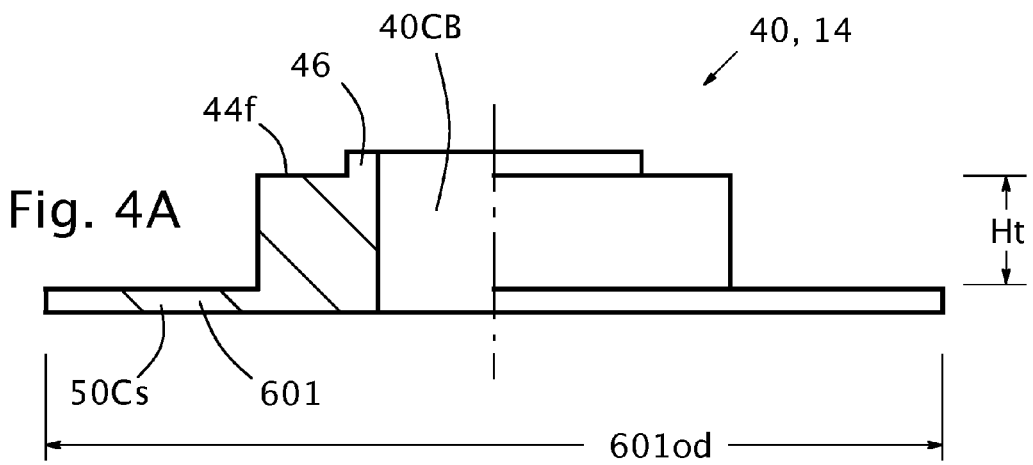
Figure 4B:
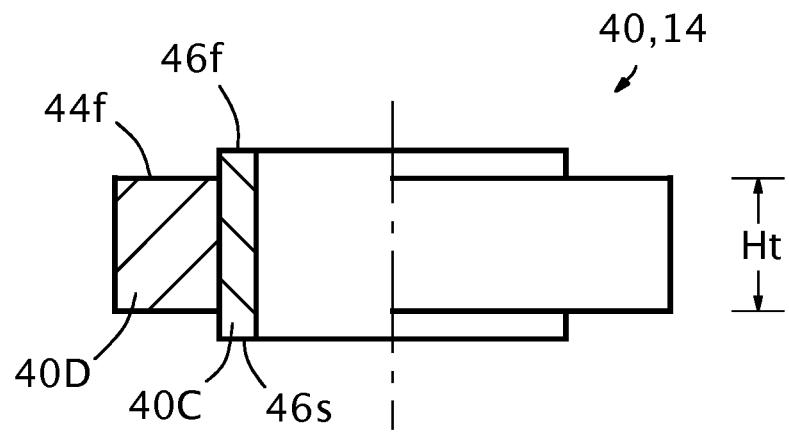
Figure 4C:
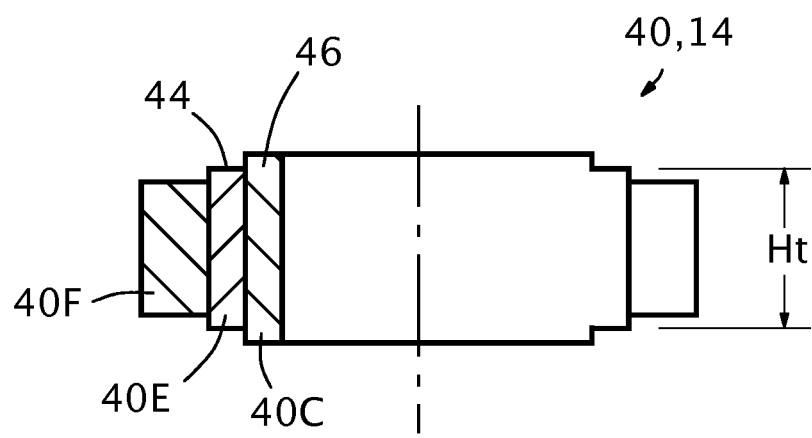

For ease of production, the hub 40 may be implemented out of an assembly of parts. For example, the hub 40 may be assembled out of two or more concentric sleeves, as shown in FIGS. 4B and 4C. In FIG. 4B, the hub is made out of two concentrically and firmly mutually attached sleeves 40C and 40D. The sleeve 40C implements the protrusions 46 and is therefore longer than and interior to the sleeve 40D forming the flats 44. As another optional embodiment, the hub may be made out of a plurality of sleeves, as depicted for example with three sleeves in FIG. 4C. In FIG. 4C, the hub 40 is made as shown in FIG. 4B, but the sleeve 40D is divided into two concentrically hub sleeves, namely hub sleeves 40E and 40F. It is the central hub sleeve 40E, intermediate hub sleeve 40C and hub sleeve 40F, that may be configured to form the flats 44. The hub sleeve 40F is disposed in radial interference fit or radial compression fit in the central opening 20CB to allow slip when the threshold torque limit is exceeded.

The hub thickness Ht of the central sleeve 40E is a calibrated and well-defined distance, which is selected to provide the desired axial pressure fit on the processing tool 20 and on the ring(s) 50 during assembly.

The plurality of rings 50 may include various types of rings, for example, pressure rings 50P, friction rings 50F, cover rings 50C, jacket rings 50J, pressure and friction rings 50PF, shim rings 50SH, and hub rings 50H. The hub rings 50H may be considered as a type of rings 50, or may be regarded as being a portion of the hub structure 14, or of the hub 40. Rings 50 that are disposed on the side of the processing tool first side 22f have a reference sign that carries the suffix f while rings disposed on the side of the processing tool second side 22s have a reference sign that carries the suffix s. In the case of a pressure ring 50P for example, a pressure ring 50Pf and a pressure ring 50Ps are disposed, respectively, on the side of the processing tool first side 22f and on the side of the processing tool second side 22s. Likewise, for cover rings 50C, cover rings 50Cf and 50Cs are disposed, respectively, on the side of the processing tool first side 22f and on the side of the processing tool second side 22s. The terms "first side" and "second side" refer, respectively, to the first side 22f and to the second side 22s of the processing tool 20.

For more than one ring 50 of the same type on the same side of the processing tool 20, an integer may be appended to the reference sign. Such an integer may range from 1 to n, where the ring indicated with the digit 1 is disposed closest to the processing tool 20. For example, pressure ring 50Pf3 may designate a third pressure ring disposed on the side of the processing tool first side 22f in addition to two other pressure rings 50Pf, namely 50Pf1 and 50Pf2, where 50Pf1 is closest to the processing tool 20. Since rings 50 of the same type may have a same or different thickness, an integer may be appended to the reference sign t, which is added to the designation of the ring 50. Such an integer may range from 1 to m, where the ring thickness indicated with the digit 1 being disposed closest to the processing tool 20, similar to the description hereinabove with reference to the plurality of rings 50 of the same type.

FIGS. 4 to 7 illustrate further details of the exemplary embodiment 100, and FIG. 8 is an exploded view of the processing device 60 shown in FIGS. 2 and 3.

Figure 5:
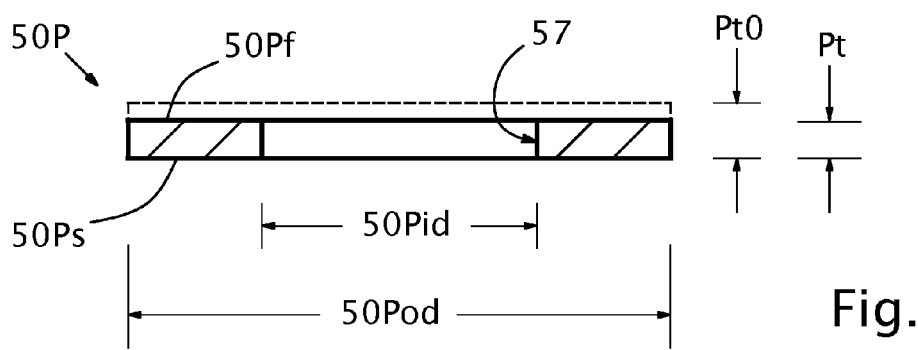

FIG. 3 depicts two pressure rings 50P, namely 50Pf and 50Ps that are disposed concentrically around the exterior diameter 40od of the hub 40. One first-side pressure ring 50Pf is disposed on the side of the processing tool first side 22f and one second-side pressure ring 50Ps disposed on the on the side of the processing tool second side 22s. The interior diameter 50Pid of a pressure ring 50P, shown in FIG. 5, may be larger than the exterior diameter 40od of the hub 40, to provide free radial rotation fit about the hub. As described hereinbelow, it is possible to couple a pressure ring 50P having an interior diameter 50Pid in fixed attachment to the hub 40, for example by radial interference fit with the exterior diameter 40od. The thickness of a compressed pressure ring 50P is indicated as Pt. As shown in FIG. 5, a pressure ring 50P has an interior periphery 57, or 57P, and a free thickness or height Pt0 that may be compressed to the thickness or height Pt.

Figure 9:
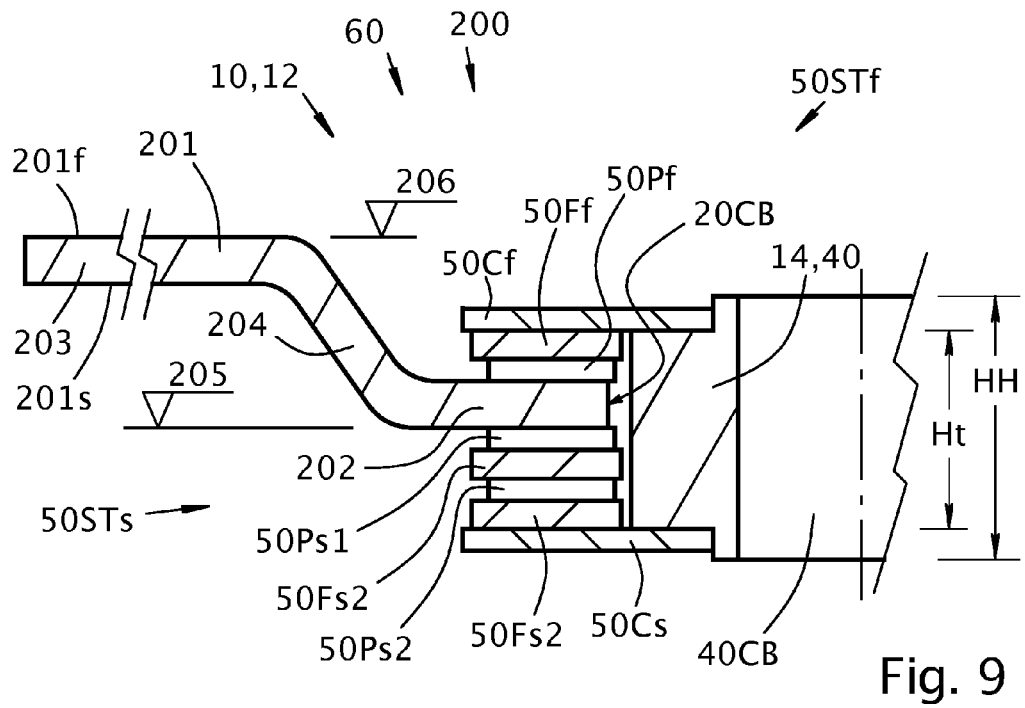
FIGS. 9 and 9A illustrate an embodiment 200.

The pressure rings 50P may be chosen as elastic and resilient elements, made for example out of rubber, or of elastomeric material, or out of metal, such as an elastic washer or as a mechanical spring. Washers may include for example flat washers, tooth lock washers that are either flat or conical, conical washers, and spring washers. A flat or other metal washer may be made out of Nitinol, or of a super-elastic alloy, or out of shape memory alloy, or of other suitable alloys. As described hereinbelow, pressure rings 50P may also operate as friction rings 50F and as coverings 50C. Pressure rings 50P may be appropriately selected to resiliently apply axial expansion force in response to axial compression forces exerted thereon. Furthermore, pressure rings 50P may be fixedly retained to the processing tool 20 or to the hub 40, or to a ring 50. A pressure ring 50P may be fixedly attached to the processing tool 20, for example by adhesive, or by heat treatment process, or by mechanical means. As shown for example in FIG. 9, more than one pressure ring 50P may be disposed on one side 22 of the processing tool 20. For example, the clutch mechanism 12 may be configured to accept a plurality of first-side pressure rings 50Pf, which are disposed on the side of the processing tool first side 20, and are marked as 50Pf1, 50Pf2, . . . , 50Pfn, as shown in FIG. 9 by Pf1 and Pf2. When axially compressed by force away from their free height Pt0, the pressure rings 50P may respond by applying the same force in the opposite direction.

In FIG. 3 there are shown for example, two friction rings 50F that are disposed concentrically around the exterior diameter 40od of the hub 40, one friction ring on each one of the two sides of the processing tool 22. Each one of the two friction rings 50F is disposed in concentric abutment with a respective one of the two pressure rings 50P. The friction rings 50F may be selected as metal rings such as steel or iron washers for example, but other materials may also be considered, such as plastics or artificial materials. The interior diameter 50Fid of a friction ring 50F, shown in FIG. 6, may be larger than the exterior diameter 40od to provide free radial rotation fit about the hub 40. As described hereinbelow, it is possible to implement a friction ring 50F having an interior diameter 50Fid which is fixedly attached to the hub 40, for example by radial pressure interference fit with the exterior diameter 40od. In general, a ring 50 may be disposed in free radial and rotational fit respective to a hub 40, or in radial force friction fit with the hub for fixed retention thereto.

Alternatively, a ring 50, such as the friction ring 50F for example, may be coupled by radial mechanical engagement or radial geometric engagement, for fixed rotational engagement with the hub 40 while allowing axial displacement relative to the axis of rotation, or axis of symmetry of the hub. One example of radial geometric engagement of a ring 50 with the hub 40 is shown in FIG. 6A, but evidently, many other variations of radial geometric engagement shapes and means are possible, as well known in the art.

Figure 6:
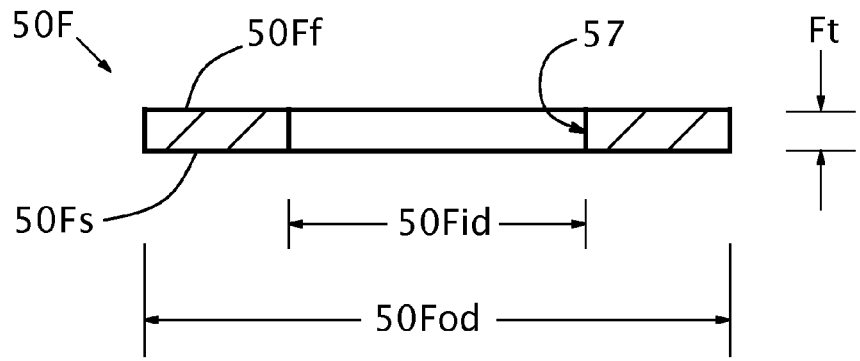
Figure 6A:
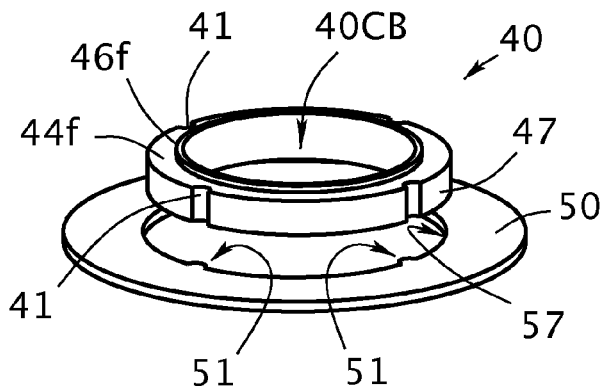
FIG. 6A depicts radial geometric engagement of a ring with the hub.

FIG. 6A shows four axial indentations 41 distributed on the exterior surface 47 of the hub 40 and configured to match four ring teeth 51 disposed on the interior periphery 57 of a ring 50. A ring 50 with ring teeth 51 will thus be coupled in radial rotational engagement with a hub 40 having matching indentations 41. However, a ring 50 without ring teeth 51, as show for example in FIGS. 5 to 7, may be disposed in free rotational fit relative to a hub 40, even when the hub 40 has axial indentations 41.

A friction ring 50F has a height or thickness that is indicated as Ft, and an interior periphery 57, or 57F.

Figure 7:
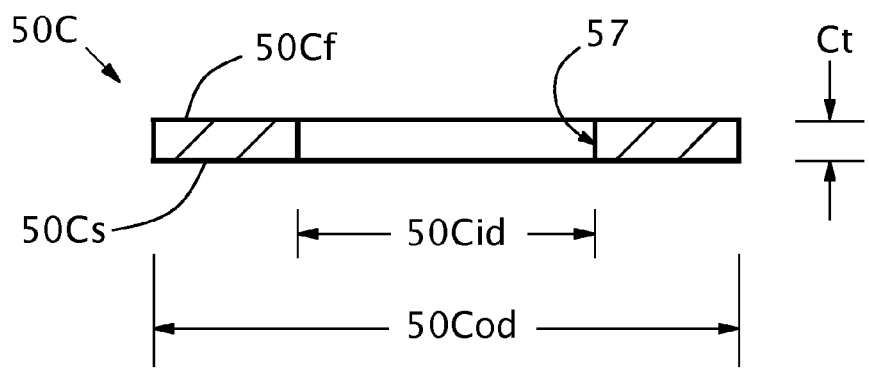

Cover rings 50C may be disposed concentrically around the exterior diameter 46od of the hub protrusions 46, and a cover ring may concentrically abut on one respective friction ring 50F, or other ring 50, that is disposed on one or both sides of the processing tool 20. The interior periphery 57C of a cover rings 50C, shown in FIG. 7, may be fixedly attached to the hub exterior surface 47, for example by radial pressure fit with the exterior diameter 46od of the hub protrusion 46. Alternatively, the interior diameter 50Cid of a cover rings 50C may be larger than the exterior diameter 46od of the hub protrusion 46 to allow free radial rotation fit about the hub 40, but still be fixedly attached to the hub by other means. Each one of the cover rings 50C may cover, at least partially, one circular flat 44 of the hub 40, and also a respective friction ring 50F, or other ring 50. Ct indicates the height or thickness of a cover ring 50C, as shown in FIG. 7.

When the rings 50 are piled up as in FIG. 3, there is formed a stack or a set of rings 50ST that are disposed in symmetry on each side of the processing tool 20, but asymmetric sets 50ST may also be practical. Closest to the processing tool 20 is the pressure ring 50P, which is followed by the friction ring 50F whereafter comes the cover ring 50C, which is thus the farthest away from the processing tool 20.

One side of the pressure rings 50P may be fixedly attached, say by adhesive, to the processing tool 20 and the other side thereof may be fixedly attached to the respective adjacent friction ring 50F. The cover rings 50C may be fixedly retained to the hub 40, either by radial pressure fit to their respective protrusions 46, or by fixed attachment to their respective circular flats 44. Radial pressure fit means appropriately selected coupling between the internal diameter 50Cid of the cover ring 50C and the external diameter 46od of the hub 40. The attachment of a cover ring 50C to a circular flat 44 may be achieved for example, by use of adhesive, welding and the like, or by mechanical fastening means.

It is noted that if for some reason the axial pressure exerted by and between the cover rings 50C does not precisely provide the desired predetermined axial compression fit elastic strain deformation Δt, the jaws 34 will supplement the missing portion of the deformation when clamping on the processing device 60. This means that the desired axial elastic deformation Δt will be maintained even if some compression force was lost either due to relaxation, flexibility, and deflection of the cover rings 50C, or due to manufacturing inaccuracy.

As described hereinbelow with respect to a set 50ST of the embodiment 100, the processing tool 20, the pressure ring 50P and the friction ring 50F may be attached to each other by adhesive, and the cover ring 50C may best be fixedly attached to the hub 40. Thereby, when the processing device 60 operates in rotation, and when the predetermined torque limit is reached, the friction rings 50F may slip relative to their respective cover rings 50C. Slipping of the processing device 60 means uncoupling of rotation such that relative to the spindle 32, the processing tool 20 rotates slower, and may sometimes even come to a stop.

Assembly of Embodiment 100

The embodiment 100 of the processing device 60 shown in FIG. 3 may be assembled axially as follows, or in different steps of assembly if so chosen.

To begin with, a second-side cover ring 50Cs may be fixedly attached to the hub 40, as described hereinabove, either by radial compression fit on the second-side protrusions 46s, or by fixed attachment to the second-side circular hub flat 44s. Attachment of the second-side cover ring 50Cs to the second-side circular hub flat 44s may be realized by mechanical fastening, or by use of a welding, or brazing, or soldering process. The second-side cover ring 50Cs may serve as a support for the subsequent rings 50 and for the processing tool 20. Alternatively, the hub 40 may be configured such that the second-side cover ring 50Cs is built-in as a flange 601 that is an integral portion of the hub, as shown in FIG. 4A for example. Even though the second-side cover ring 50Cs in FIG. 4A is a flange 601 of the hub 40, reference may be made thereto as the second-side cover ring 50Cs. If desired, the hub 40 may be selected as an assembly of concentric hub sleeves 40C and 40D shown in FIG. 4B, or as concentric hub sleeves 40C, 40E, and 40F, shown in FIG. 4C. It is noted that the well-defined hub thickness Ht remains accurately calibrated in the various embodiments of the hub 40 described herein.

Next, a second-side friction ring 50Fs may be centered on the hub 40 and be seated and supported by the second-side cover ring 50Cs, or flange 601. Following that, the second-side pressure ring 50Ps may be centered on the hub 40 and be seated on the second-side friction ring 50Fs. If desired, the second-side pressure ring 50Ps may be fixedly attached to the second-side friction ring 50Fs, by use of an adhesive for example.

In turn, the processing tool 20 may be centered on the hub 40 and if desired, the second side 22s of the processing tool may be fixedly attached to the second-side pressure ring 50Ps, possibly by use of adhesive or other means. For example, the second-side pressure ring 50Ps may have a coat of adhesive on both sides thereof and adhere to the second-side friction ring 50Fs on one side, and to the processing tool second side 22s on the other side. Alternatively, the second-side pressure ring 50Ps may be chosen as a two-sided adhesive tape, where the material intermediate the adhesive forms the elastic and resilient second-side pressure ring. For example, a two sided adhesive tape may be selected as a double-face polypropylene tape Plasto P573, such as made by Plasto, of 44 de Longvic street, P.O. Box 160, 21304 Chenove Cedex, in France. Other double-face adhesive tapes may also be selected.

Optionally, a pressure ring 50P may be configured as a ring of latex that may be glued to one or to two adjacent rings 50. If desired, a pressure ring may be selected as an O-Ring, the name of which is a Trademark.

So far, the set of rings 50 that is disposed on the second side 22s of the processing tool 20 is stacked and topped by the processing tool 20. In the embodiment 100, the set of rings 50ST that is disposed on both sides of the processing tool 20 is assembled in mutual mirroring symmetric. Hence, the first-side set of rings 50STf that has to be disposed adjacent the processing tool first side 22f, may be disposed in mirroring symmetry to the second-side set of rings 50STs that is already assembled on the second side 22s.

Sequentially, the first-side pressure ring 50Pf may be centered on the hub 40, followed by the first-side friction ring 50Ff and the first-side cover ring 50Cf. The first-side pressure ring 50Pf may be fixedly retained in the same manner as described hereinabove with respect to the second-side set of rings 50STs.

At this stage, the first-side cover ring 50Cf may protrude higher up above the hub thickness Ht and may not be seated on the first-side circular flat 44f, since the pressure rings 50P have not yet been compressed to their loaded or operational thickness Pt.

In the final step of assembly of the embodiment 100 of the processing device 60, the first-side cover ring 50Cf is axially compressed toward the second-side cover ring 50s, such that the rings 50 therebetween are compressed toward the processing tool 20. Under the pressure of axial compression, the two pressure rings 50P will deform or deflect away from their free thickness Pt0 and reach a selected compressed operational thickness Pt. When the first-side cover ring 50Cf is properly seated on the first-side circular flat 44f, then the shortest distance separating apart between both cover rings 50C is the hub thickness Ht. Thereby, the slip clutch 10 is appropriately compressed to the selected axial pressure fit $\Delta t$, and the resilient pressure rings 50P are correctly compressed and both parallel to the processing tool 20. The first-side cover ring 50Cf may now be fixedly attached to the hub 40 to axially support the rings 50 in their compressed state, in the ready-to-operate mode. The fixed attachment of the first-side cover ring 50Cf to the hub 40 may be achieved by radial friction fit with the protrusion 46f, or by fixed attachment to the circular flats 44, as described hereinabove, or by cold forming processes, such as swaging for example.

The result of the assembly process is an enhanced material-processing device 60, or processing device 60, having a slip-clutch 10 that is integrally embedded into the processing tool 20.

In other words, when the first-side cover ring 50Cf, thus the last cover ring to complete the assembly of the slip clutch 10, is fixedly coupled to the hub 40, the pressure rings 50P, which maintain the compression on the processing tool 20, are preloaded under axial loading forces applied thereto. The resultant axial reaction forces applied by the pressure rings 50P onto the processing tool 20 may be equal the assembly loading forces. In operation, the axial force exerted by the jaws 34 on the processing device 60 provide a moment necessary for transfer of rotation from the spindle 32, via the clamps 34, to the processing device 60, to rotate the processing tool 20, but up to a certain torque limit. The torque limit is the threshold torque limit, or slippage threshold that when reached, starts to reduce the speed of rotation of the processing tool 20 relative to the speed of rotation of the spindle 32.

In practice, after assembly of the processing device 60, there may be some relaxation of the pressure exerted by the pressure rings 50 on the processing tool 20. As described hereinabove, the clamping of the jaws 34 on the center portion 21 of the processing tool 20 is directed to firmly seat the cover rings 50C on their respective circular hub flats 44 to return the axial compression fit to the predetermined elastic strain deformation $\Delta t$.

Operation of the Slip Clutch

Within the processing device 60, which is clamped between the jaws 34, the two resilient pressure rings 50P supported by the processing tool 20 force each one of the two friction rings 50F against one of the two respective cover rings 50C. When the jaws 34 rotate the cover rings 50C, rotation may be imparted sequentially therefrom to the friction rings 50F and to the pressure rings 50P that rotate the processing tool 20.

However, the processing tool 20, which may be used for example to cut a pipe made of metal, may become stuck or arrested during the cutting process. This means that the arresting moment encountered by the processing tool 20 is equal to or is greater than the rotational moment exerted by the power tool 30. To prevent damage, either to the power tool 30 or to the processing tool 20, it may be advantageous to disconnect the direct transmission of rotation between the spindle 32 and the processing tool 20. It is the slip-clutch 10 that provides such disconnection of transmission of direct rotational input, which is followed by a limited transfer of rotation sufficient to permit the operator to redirect the processing tool 20 in the workpiece.

The task of the slip-clutch 10 is to limit or to eventually disconnect the rotational input of rotation to the processing tool 20 when this last one is hindered from rotation, thus prevented or even arrested from rotating freely for some reason. When the moment that prevents rotation of the processing tool 20 equals or exceeds a predetermined torque threshold, for which the slip-clutch 10 is designed, slippage will occur. In the embodiment 100, the rings 50 and the processing tool 20 may be disposed in free rotational fit relative to the hub 40. Furthermore, the friction rings 50F may be fixedly coupled to the processing tool 20 via the pressure rings 50P, to form one entity therewith. Likewise, the cover rings 50C are fixedly coupled to the hub 40. In that case, slip will occur on a friction surface FRSR common to a friction ring 50F and a cover ring 50C, as shown in FIG. 2.

The predetermined threshold limit of transmission of rotation of the slip-clutch 10 may be controlled by at least one of the following: the axial force exerted by the pressure rings 50P, the hub thickness Ht, and the coefficient of friction $\mu$, in particular between the friction rings 50F and the cover rings 50C. Evidently, the coefficient of friction $\mu$, depends on the material and on the surface treatment of the friction surfaces FRSR. Reference to the friction surfaces is provided hereinbelow.

After seating the cover rings 50C on their respective circular hub flats 44, the compression force exerted by the cover rings 50C depends on the hub thickness Ht of the hub 40. Taking the thickness t of the various rings 50 and the thickness 20t of the processing tool 20 into consideration, it is thus the appropriate selection and mutual adaptation of the hub thickness Ht and of the material wherefrom the rings 50 are made that may determine the predetermined threshold limit of slip of the clutch 10.

Therefore, the hub thickness Ht, which determines the axial compression elastic strain deformation $\Delta t$, is one of the parameters, or arguments, defining the controllable torque threshold limit, or slippage threshold of the slip clutch 10. The coefficient of elasticity c of the pressure rings 50P is another one of the parameters, or arguments, defining the controllable torque threshold. It is the axial elastic strain deformation of a pressure ring 50P times the coefficient of elasticity c thereof that creates a resultant axial force. Without taking the jaws 34 into consideration, other parameters may include the coefficient of friction μ of the mutual slipping surfaces and the number of active mutually slipping surfaces, as well as the exterior diameter of the various rings 50.

It is understood from the description hereinabove that various parameters and mechanisms are available with the embodiments of the present invention to control the amount of torque transferred from the rotating spindle 32 to the material processing tool 20.

Operation of the Enhanced Material-Processing Device

An operator, or user, not shown in the FIGS., may use the processing device 60 as follows.

First, the processing device 60, which includes the processing tool 20 wherein the slip-clutch 10 is integrally embedded, is clamped between the jaws 34 of the power tool 30. The jaws 34 thereby firmly grip the cover rings 50C. When the power tool 30 is turned to the operative ON state, the rotation of the spindle 32 rotates the jaws 34 whereby the processing device 60 is also rotated. Operation proceeds as with a commonly available power-tool-mounted standard processing tool 19.

The processing device 60, which may be used for example to cut a pipe made of metal, may become stuck during the cutting process. This means that the force encountered at the periphery of the processing tool 20 times the radius thereof is equal to or greater than the moment exerted thereon by the power tool 30. In contrast with a commonly available standard power-tool-mounted processing tool 19, the operation of the slip-clutch of the processing device 60 will prevent damage, to the power tool 30 and/or to the enhanced processing tool 20, by partial or even complete disconnection of rotation of the processing tool. More important, the slip clutch 10 may be selected to prevent loss of control that the user has over the handheld power tool 30, thus to ensure safe user-control of the power tool. This means that the slip-clutch 10 may partially or completely uncouple the rotation of the processing device 60 relative to the rotation of the spindle 32.

When such an event occurs, the operator may slightly disengage the processing tool 20 out of the cut and then resume the cutting process. Such disengagement mostly calls for a slight retrieval or a change of angle of attack of the processing tool 20, without completely stopping the rotation thereof, to relieve the force hindering the full rotational power transfer from the spindle 32 to the processing tool. Thereafter, the material processing operation proceeds as usual.

Alternative Embodiments

Embodiment 200

FIG. 9 illustrates a schematic partial cross-section of an exemplary embodiment 200 of the processing device 60. In the embodiment 200, a hub structure 14 is coupled to a recessed processing tool 201 having a central portion 202 and a peripheral portion 203 that are mutually coupled to each other by a cup-like portion 204.

Figure 9A:
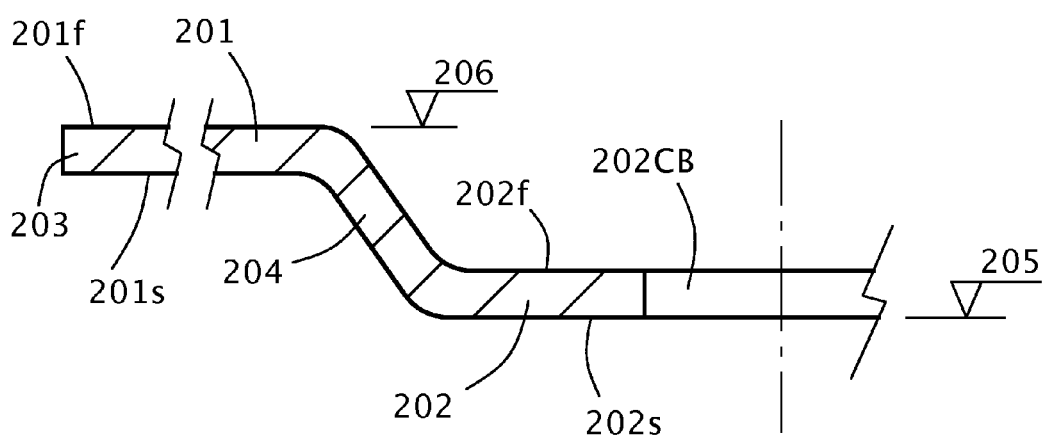

As shown in FIG. 9A, the central circular opening 20CB, which is opened in the recessed processing tool 201, is disposed in a first plane 205 proximal the power tool 30, which is not shown. Furthermore, the peripheral portion 203 is disposed in a second plane 206, which is parallel to and is disposed farther and distally away from the power tool 30 than the first plane 205.

In FIG. 9, the hub thickness Ht protrudes in asymmetry relative to the processing tool 201, much more to the second side 201s than to the first side 201f, but the hub 40 does not cross the second plane 206. If desired however, the hub 40 may be appropriately disposed to protrude in symmetry out of the two sides 202f and 202s of the recessed processing tool 201.

The number of the various types of rings 50 disposed on the second side 201f may be larger than the number of rings disposed on the first side 201s. This means that the number of rings 50 disposed on each side of the recessed processing tool 201 may be the same or may be different. Furthermore, the thickness t of the various types of rings 50 may also be the equal or different. Moreover, the hub 40 may protrude in symmetry or asymmetrically out of the sides of the processing tool 201, which is also true for the various embodiments described in the embodiments of the present invention.

With reference to the embodiment 200 shown in FIGS. 9 and 9A, the second-side set of rings 50STs that is disposed on the second side 202s of the central portion 202 of the processing tool 201 includes one cover ring 50Cs, two friction rings 50Fs, and two pressure rings 50Ps. The two second-side friction rings 50Fs are marked as the first second-side friction ring 50Fs1 and as the second second-side friction ring 50Fs2, and the two pressure rings 50Ps are indicated as the first second-side pressure ring 50Ps1 and as the second second-side pressure ring 50Ps2.

Likewise, the first-side set of rings 50STf which is disposed on the first side 202f of the central portion 202 may have one cover ring 50Cf, followed in sequential succession by one friction ring 50Ff, and one pressure ring 50Pf.

The cover rings 50C of the various embodiments of the present invention may be fixedly coupled in engagement with the hub 40.

Figure 13:
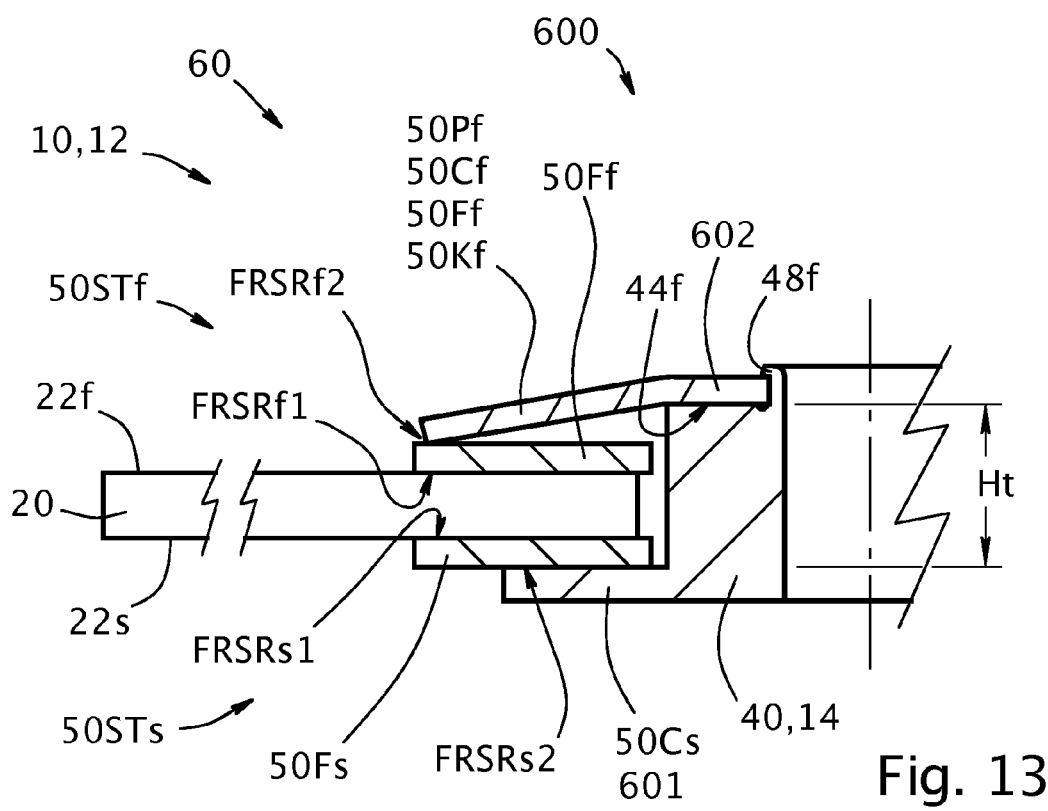
Figure 14:
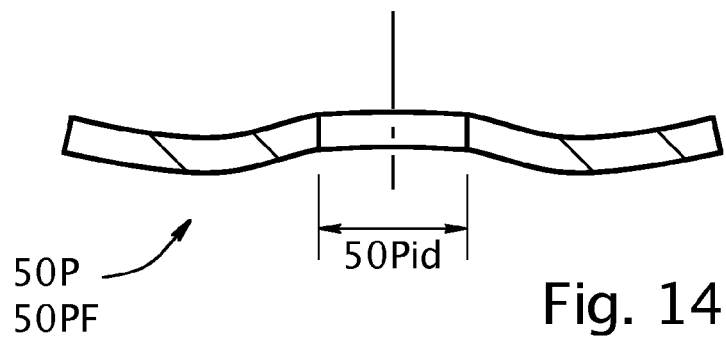

In the same manner as where applicable for the various embodiments of the present invention, the pressure rings 50P may be selected for example as double sided adhesive tape, Belleville springs as shown in FIG. 13, "crown" type rings, flat washers made of metal or other appropriate materials as in FIG. 5, "wavy" spring washers shown in FIG. 14, and other resilient elements.

In the embodiment 200, like for the other embodiments of the present invention, the processing tool 201 may be disposed in free rotation fit relative to the hub 40, but other types of rings 50 may be coupled in free rotation fit, or in fixed coupling, or in rotational engagement but axially-free coupling, relative to the hub 40. Moreover, selected rings 50 may be coupled either to the processing tool 201 or to other adjacent one or more rings. It is thereby possible to control the number of mutual friction surfaces between rings 50 to obtain a desired torque threshold limit. Further control over the torque threshold limit may be obtained by appropriate selection of the type of material, of the texture of the surface, and of the surface treatment applied to the various rings 50.

With the embodiment 200, the assembly of the rings 50 and of the processing tool 201 on the hub 40 permits to controllably adjust a desired predetermined threshold torque or torque limit of transmission of rotation of the slip-clutch 10, like for the other embodiments described herein. It is noted that it is possible to configure the hub 40 to support a variety of pressure rings 50P and of friction ring 50F in addition to the cover rings 50C.

The axial assembly of the embodiment 200, and the operation and use thereof are similar to the description provided hereinabove respective to the embodiment 100, and is therefore not repeated.

Embodiment 300

Figure 10:
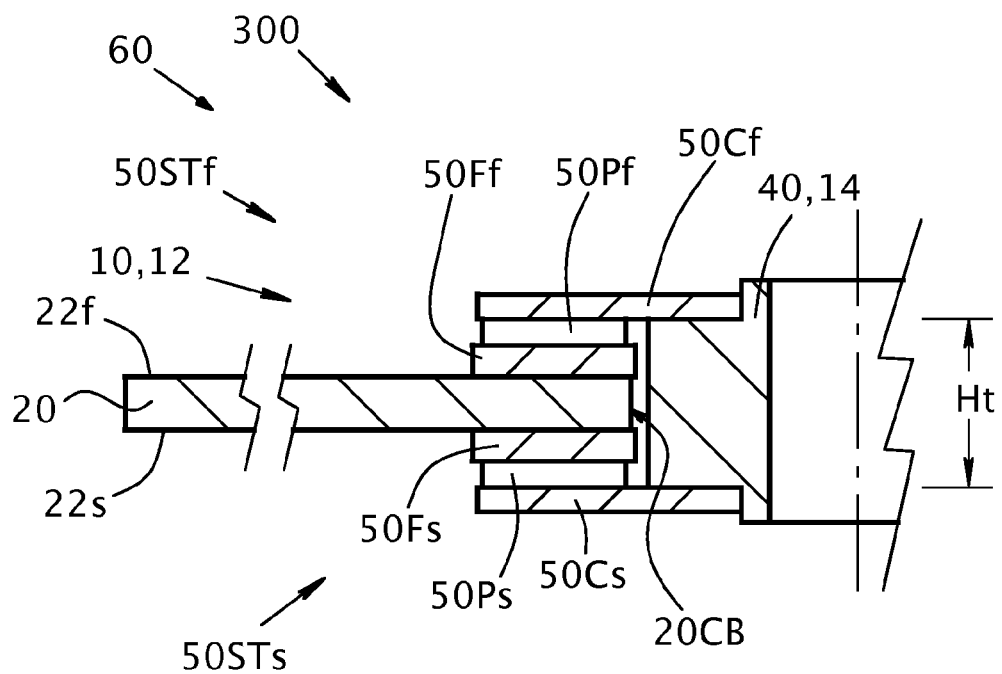
FIGS. 10 to 13 show further embodiments, respectively 300 to 600.

FIG. 10 depicts a schematic partial cross-section of an exemplary embodiment 300 showing a hub structure 14 supporting various types of rings 50.

In FIG. 10, the first-side set of rings 50STf disposed on the first side 22f of the processing tool 20 includes one first-side cover ring 50Cf, one first-side friction ring 50Ff, and one first-side pressure ring 50Pf. The second-side group of rings 50STs disposed on the second side 22s of the processing tool 20 includes the same number and same type of rings 50 as those on the first side 22f, but disposed in mirroring symmetry relative to the processing tool 20.

In the embodiment 300, like for the other embodiments of the present invention, the processing tool 20 may be disposed in free rotation fit relative to the hub 40, but other types of rings 50 may be coupled in free rotation fit, or in fixed coupling, or in rotational engagement but axially-free coupling, relative to the hub 40. Moreover, rings 50 may be mutually coupled either to the processing tool 20 or to each other in couples of two or more of rings. It is thereby possible to control the number of mutual friction surfaces to obtain a desired torque threshold limit.

In comparison with FIG. 3, the order of the pressure rings 50P and of the friction rings 50F has been interchanged.

With the embodiment 300, the assembly of rings 50 and of the processing tool 20 on the hub 40, permits to controllably adjust a desired predetermined threshold torque or torque limit of transmission of rotation of the slip-clutch 10. It is noted that it is possible to configure the hub 40 to support a variety of types of pressure rings 50P and of friction ring 50F in addition to the cover rings 50C.

The axial assembly of the embodiment 300, and the operation and use thereof are similar to the description provided hereinabove respective to the embodiment 100, and is therefore not repeated.

Embodiment 400

Figure 11:
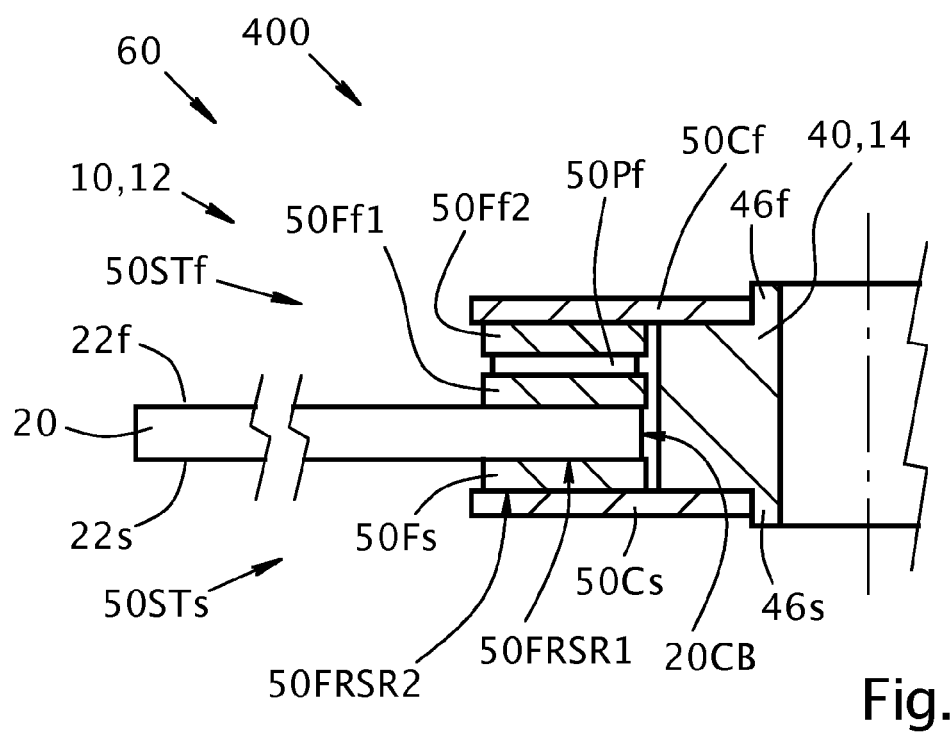

FIG. 11 presents a schematic partial cross-section of one more exemplary embodiment 400 similar to the embodiment 100 but with a hub structure 14 supporting an asymmetric and different arrangement of set of rings 50ST.

In FIG. 11, the first-side set of rings 50STf, which is disposed on the first side 22f of the processing tool 20, includes one cover ring 50Cf, two friction rings 50Ff1 and 50Ff2, and one pressure ring 50Pf. The one pressure ring 50Pf is disposed intermediate between the two friction rings 50Ff2 and 50Ff1. The first first-side friction ring 50Ff1 is disposed adjacent the first side 22f of the processing tool 20, and the second first-side friction ring 50Ff2 is disposed adjacent the first-side cover ring 50Cf most distal relative to the processing tool 20.

The second-side set of rings 50STs that is disposed on the second side 22s of the processing tool 20 includes one cover ring 50Cs, and one friction ring 50Fs. The one second side friction ring 50Fs is disposed intermediate the processing tool 20 and the second side cover ring 50Cs to provide at least one out of two friction surfaces FRSR: For example, one friction surface relative to the processing tool 20 as FRSR1, and a second friction surface FRSR2 relative the second-side cover ring 50Cs. If desired, an appropriate fixed coupling of the second side friction ring 50Fs to the processing tool 20, say by adhesive, will provide a second friction surface FRSR2 relative the second-side cover ring 50Cs. Similarly, fixed coupling of the second side friction ring 50Fs to the cover ring 50s, say by adhesive, or to the hub 40, e.g. by pressure fit interference, will provide a first friction surface FRSR1.

In the embodiment 400, like for the other embodiments of the present invention, the processing tool 20 may be disposed in free rotation fit relative to the hub 40, but other types of rings 50 may be coupled in free rotation fit, or in fixed coupling, or in rotational engagement but axially-free coupling, relative to the hub 40. Moreover, rings 50 may be mutually coupled either to the processing tool 20 or to each other in couples of two or more of rings. It is thereby possible to control the number of mutual friction surfaces FRSR to obtain a desired torque threshold limit.

The cover rings 50C are fixedly attached to the hub either by pressure fit to the protrusions 46, or by fixed retention to the circular hub flats 44, as described hereinabove with respect to the embodiment 100.

With the first side set of rings 50STf, the pressure ring 50Pf may be fixedly attached to the first first-side friction ring 50Ff1 and/or to the second first-side friction ring 50Ff2. If desired, but not shown as such in FIG. 11, the first first-side friction ring 50Ff1 may be fixedly coupled to the processing tool 20 or to the hub 40, and the second first-side friction ring 50Ff2 may be fixedly coupled to the first side cover ring 50Cf or to the hub 40. The various types of ring coupling may provide control over the number of pressure surfaces PRSR. Such couplings may provide at least three friction surfaces FRSR, not shown in FIG. 11, in the first side set of rings 50STf: between the first first-side friction ring 50Ff1 and the processing tool first-side 22f, between the first-side friction ring 50Ff1 and the first side pressure ring 50Pf, and between the first-side second friction ring 50Ff2 and the first-side cover ring 50Cf.

With the first side set of rings 50STf, it is possible to provide one or two friction surfaces FRSR. For two friction surfaces FRSR, one may fixedly attach the first-side first friction ring 50Ff1 to the processing tool 20 and the second first-side second friction ring 50Ff2 to the cover ring 50Cf. Friction will thereby occur on both sides of the first-side pressure ring 50Pf. To obtain but one friction surface FRSR in the first side set of rings 50STf, one may for example fixedly and mutually couple to each other, the first first-side friction ring 50Ff1, the second first-side friction ring 50Ff2, and the pressure ring 50Pf to the processing tool 20. Such coupling will provide one friction surface FRSR1, not shown, between the second friction ring 50Ff2 and the first-side cover ring 50Cf.

Even though not shown in FIG. 11, both sets of rings 50ST may include other combinations of types of rings 50, and a variety of combinations of disposition in sequential order of different types of rings. Furthermore, the number of rings 50 and their type may be selected as desired to obtain a desired predetermined threshold torque limit of the slip-clutch assembly 10.

With the embodiment 400, the appropriate assembly, and selected coupling together of rings 50 and of the processing tool 20 on and with the hub structure 14, or hub 40, permits to controllably adjust a desired predetermined threshold torque or torque limit of transmission of rotation of the slip-clutch 10. It is noted that it is possible to configure the hub 40 to support a variety of pressure rings 50P and of friction ring 50F in addition to the cover rings 50C.

The axial assembly of the embodiment 400, and the operation and use thereof are similar to the description provided hereinabove respective to the embodiment 100, and is therefore not repeated.

Embodiment 500

Figure 12:
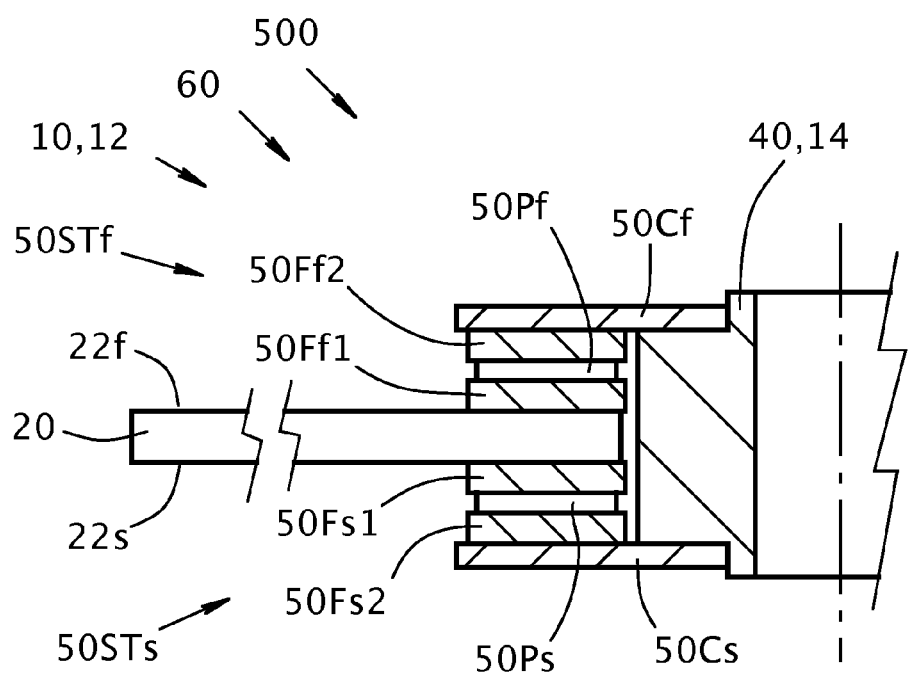

FIG. 12 illustrates a schematic partial cross-section of still one more exemplary embodiment 500 similar to the embodiment 400 but with a hub structure 14 supporting two sets of rings 50ST disposed in mirroring symmetry on both sides 22 of the processing tool 20.

In the embodiment 500, the rings 50 on the first-side set of rings 50STf are identical to the rings on the first-side set of rings 50STf of the embodiment 400. The rings 50 on the first-side set of rings 50STf are also identical to the rings on the second-side set of rings 50STs.

The first-side set of rings 50STf has a pressure ring 50Pf disposed between two friction rings, respectively 50Ff1 and 50Ff2, and these three rings 50 are sandwiched between the processing tool 20 and the first-side cover ring 50Cf.

The description provided hereinabove with reference to the embodiment 400 is also valid for the embodiment 500, and is therefore not repeated.

The first side cover ring 50Cf is fixedly attached to the hub 40 either by pressure fit or by other means as described herein. The same may be true for the second side cover ring 50Cs, which may also be selected as a flange 601 that is integral with the hub 40, as shown in FIG. 13.

In the embodiment 500, the processing tool 20 is disposed in free rotation fit about the hub 40 and in both the first side and the second side set of rings 50ST, the two friction rings 50F may be coupled in free rotation fit relative to the hub. In addition, the first friction ring 50F1 may be fixedly coupled to the processing tool 20 and the second friction ring 50F2 may be fixedly coupled to the cover ring 50C. Moreover, the pressure ring 50P may be fixedly coupled, or disposed in rotational engagement but axial-free coupling, relative the hub 40. Such attachment will result in each set 50ST of two friction surfaces FRSR, not shown, namely one friction surface FRSR1 between the first friction ring 50F1 and the processing tool 20, and a second friction surface FRSR2 between the second friction ring 50F2 and the cover ring 50C.

Alternatively, other combinations of mutual coupling between rings 50, or attachment of rings to the hub 40 may be selected as desired to result in more or in less friction surfaces FRSR. For example, rings 50 may be mutually attached to each other by adhesive, and rings may be coupled in fixed fit, or in rotational fit, or in rotational engagement but axially-free coupling, relative to the hub 40, by mechanical fastening means or other means known to the art or as described hereinabove.

It is noted that a cover ring 50C may operate simultaneously as a friction ring 50F and/or as a pressure ring 50P.

In the second-side set of rings 50STs, the mutual attachment of rings 50s and their coupling to the hub 40 may be the same or be different from the disposition in the first-side set of rings 50STf.

Even though not shown in FIG. 12, both sets of rings 50ST may include other combinations of types of rings 50, other dispositions of sequential order of rings, and various combinations of mutual attachment and of coupling to the hub 40. The number of rings 50 and their type, or absence and disposition may be selected as desired to obtain a selected predetermined threshold torque limit of the slip-clutch 10. Such arrangements and disposition of the rings 50 permit to controllably adjust a desired predetermined threshold torque limit of transmission of rotation of the slip-clutch 10.

The axial assembly of the embodiment 500 is similar to the assembly of the embodiment 100 and is therefore not repeated.

Embodiment 600

FIG. 13 illustrates a schematic partial cross-section of another exemplary embodiment 600 having a hub structure 14 supporting two different sets of rings 50ST that are disposed in asymmetry on both sides 22 of the processing tool 20.

In FIG. 13, the first-side set of rings 50STf that is disposed on the side of the processing tool first-side 22f includes one first-side pressure ring 50Pf, and one first-side friction ring 50Ff. The pressure ring 50Pf also operates as a cover ring 50Cf, and may be regarded as being a combined cover and pressure ring 50CPf. Reference may be made to the first-side pressure ring 50Pf as a pressure ring 50P, as a cover ring 50Cf, and as a friction ring 50Ff, or as a combination ring 50K, namely as ring 50CPFf, since these three features may be combined therein. The pressure ring 50Pf is fixedly coupled to the hub 40, as described hereinbelow.

The second-side set of rings 50STs, which is disposed on the processing tool 20 second-side 22s, has one friction ring 50Fs and one cover ring 50Cs, which may be implemented as a flange 601 integral with the hub 40, as shown in FIG. 4A. The second-side cover ring 50Cs may be accepted as being a second-side cover ring 50Cs, even though being a portion of the hub structure 14.

The first-side pressure ring 50Pf, or combined first-side cover and pressure ring 50CPf, may be selected for example as an elastic spring washer made of metal, or as a Belleville spring, or as Belleville-like spring, or as a "crown" type ring. FIG. 14 illustrates a pressure ring 50P shown as a "wavy" spring washer. Other combined cover and pressure rings 50CP may evidently also be practical with the embodiments of the present invention.

The first-side and second-side friction rings 50Ff and 50Fs may be disposed in fixed radial compression fit, or in free rotation fit, or in rotational engagement but axially-free coupling, respective to the hub 40, but the cover rings 50Cf are fixedly attached to the hub 40.

The first-side friction ring 50Ff may be disposed in parallel abutment on the processing tool first side 22f and be fixedly coupled to the hub 40 say by pressure fit. Thereby, one friction surface FRSR may be provided, namely a friction surface FRSRf1 between the first-side friction ring 50Ff and the processing tool first side 22f. Alternatively, the first-side friction ring 50Ff may be fixedly coupled to the processing tool first side 22f, but not to the hub 40, by use of glue for example, such that one friction surface FRSRf2 may be formed between the first-side friction ring 50Ff and the first-side cover ring 50Cf.

It is noted that the first-side cover ring 50Cf is operative not only as a cover ring but as a pressure ring 50Pf, thus as a combination ring 50 such as a combined cover and pressure ring 50CPf, and may operate as a combined cover, pressure, and friction ring 50CPFf.

The second-side friction ring 50Fs may be coupled in free rotation fit to the hub 40 and be fixedly attached to the processing tool second side 22s to provide one friction surface FRSRs1 in common with the second side cover ring 50Cs, or flange 601. Alternatively, the second-side friction ring 50Fs may be fixedly coupled to the hub 40 by compression fit for example, or to the flange 601, and form one friction surface FRSRs2 with the processing tool second side 22s.

With the embodiment 600, the assembly of the hub structure 14, of the rings 50 and of the processing tool 20 on the hub 40, permits to controllably adjust a desired predetermined threshold torque or torque limit of transmission of rotation of the slip-clutch 10. It is noted that it is possible to configure the hub 40 to support one or more rings 50 selected out of a variety of pressure rings 50P, friction rings 50F, or as a combination ring 50K such as a cover and pressure rings 50CPF, in addition to the cover rings 50C.

In the embodiment 600, shown in FIG. 13, the first-side set of rings 50STf is different from the second-side set of rings 50STs, but if desired, the second-side set of rings 50STs may be selected in mirroring symmetry to the first-side set of rings 50STf.

The embodiment 600 may now be assembled in axial concentricity. The second-side cover ring 50Cs may be fixedly attached to the hub 40, or may be implemented as the flange 601, which is an integral portion of the hub. The second-side friction ring 50Fs may be disposed axially and in concentricity on the second-side cover ring 50Cs, or flange 601. The processing tool 20 is then centered over the second-side friction ring 50Fs. In a next step, the first-side friction ring 50Fs is axially and concentrically seated on the processing tool 20. Thereafter, the first-side pressure ring 50Pf, or combined cover and pressure ring 50CPf, is disposed on the first-side friction ring 50Fs, for fixed attachment to the hub 40.

Figure 13A:
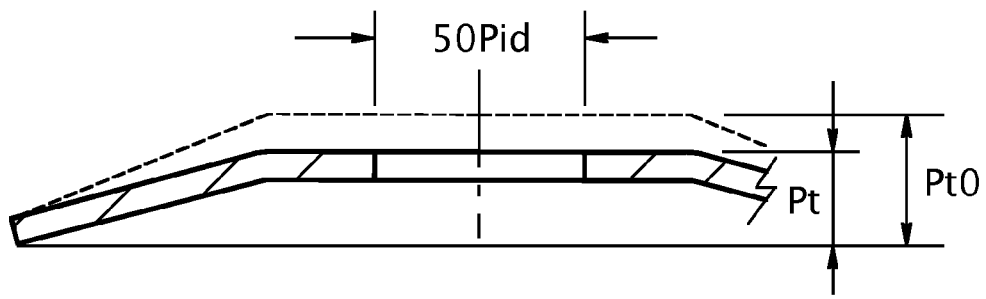
FIGS. 13A, 14, and 14A present details of the embodiment 600.

To apply a pressure fit on the processing tool 20, the pressure ring 50Pf, or 50CPf, has to be compressed from a free thickness Pt0 to a thickness Pt. To this end, the central portion 602 of the first-side pressure ring 50Pf, is compressively seated on the first-side circular flat 44f of the hub 40. Thereby, the pressure ring 50Pf is compressed from a free thickness Pt0 to a thickness Pt, as shown in FIG. 13A. As described hereinabove, the hub height Ht whereon the central portion 602 of the pressure ring 50Pf is compressively seated, is calibrated to ensure deflection through an elastic strain deformation Δt, to provide the desired axial interference fit.

Figure 14A:
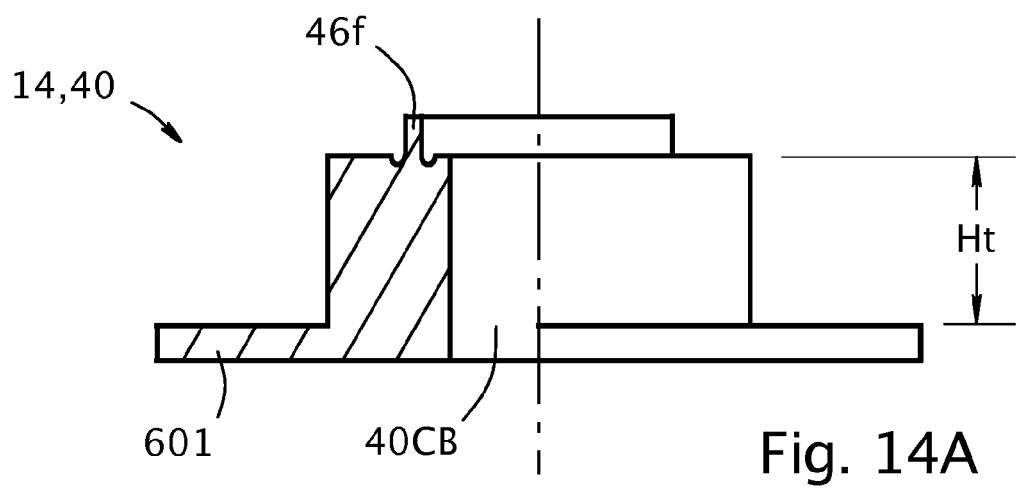

To maintain an axial interference fit, the first-side pressure ring 50Pf may be fixedly coupled to the hub 40, say by adhesive, by mechanical fastening means, or by swaging. For example, a portion of the first-side hub protrusion 46f, shown in FIG. 14A, may be swaged into a first-side swaged hub coupling 48f for clamping the central portion 602 of the first-side pressure ring 50Pf onto the first-side circular flat 44f of the hub 40, as shown in FIG. 13. Swaging is a well-known cold-working process. Once the hub 40 is swaged, the assembly of the processing device 60 is completed. Alternatively, the central portion 602 of the first-side pressure ring 50Pf may be welded to the first-side circular flat 44f.

Other means for fixedly retaining the first-side pressure and friction ring 50PFf to the hub 40 may also be practical. For example, one or more mechanical fasteners, such as pins or threaded screws, may be inserted through the central portion 602 of the first-side pressure ring 50Pf and be driven into the first-side circular flat 44f of the hub 40, for fixed retention thereto, even though not being shown as such in FIG. 13.

For coaxial assembly of the embodiment 600, the flange 601 may support the following, which are disposed thereon in succession: the second-side friction ring 50Fs, the processing tool 20, the first-side friction ring 50Ff, and the first-side combined pressure and cover ring 50CPf. Thereafter, the first-side cover ring 50Cf is compressively seated on the first-side circular flat 44f and, without releasing compression, the first-side hub protrusion 46f may be deformed thereon by swaging into a first-side swaged hub coupling 48f.

With the embodiments of the present invention, the pressure exerted by the first-side cover ring 50Cf may perhaps relax after assembly, whereby some of the axial elastic strain deformation Δt may be missing, be reduced, or be lost. However, once the processing device 60 is mounted on the power tool 30, the jaws 34 will redress the situation. It is the clamping of the jaws 34 on the enhanced processing device 60 that will cause recovery of the axial elastic strain deformation Δt.

With the embodiment 600, the assembly of rings 50 and of the processing tool 20 on the hub 40 permits to controllably adjust a desired predetermined threshold torque limit of transmission of rotation of the slip-clutch assembly 10. It is noted that an operational slip-clutch assembly 10 may be assembled out of the combined pressure and cover ring 50CPf and of the processing tool 20, both supported by a hub 40 having a second-side flange 601.

Use and operation of the processing device 60 is not different from the description provided hereinabove for the embodiment 100, and is therefore not repeated.

Embodiment 700

Figure 15:
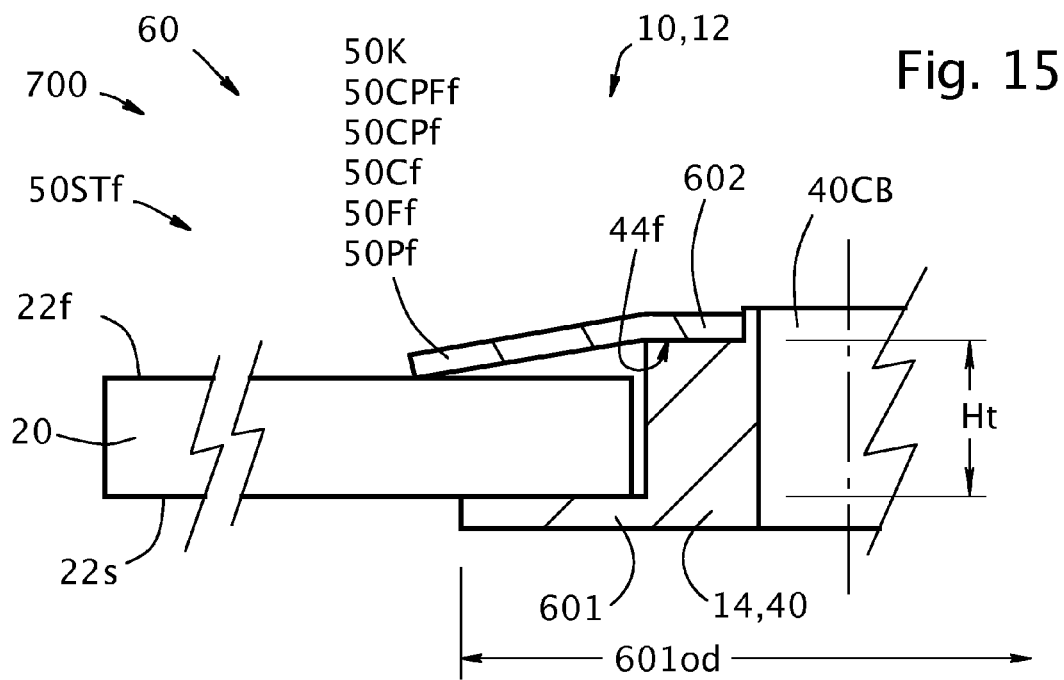
FIGS. 15 and 16 depict embodiments 700 and 800.

FIG. 15 presents a partial cross-section of one more exemplary embodiment 700 with a hub structure 14 and an asymmetric set of rings 50ST.

In FIG. 15, on the processing tool first side 22f, one first-side pressure ring 50Pf is disposed in concentricity with the hub 40 and with the processing tool 20. The central portion 602 of the first-side pressure ring 50Pf is fixedly attached to the first-side circular flat 44f of the hub 40 by means described hereinabove and well known to those skilled in the art, such as spot welding for example. The first-side pressure ring 50Pf, which maintains axial pressure on the processing tool 20, may be regarded as a combination ring 50Kf, as a combined cover and pressure ring 50CPf, or as a combined cover, friction, and pressure ring 50CPFf.

The first-side pressure ring 50Pf presses on the processing tool 20, which, on the second side 22s thereof, is supported by a flange 601 that may be integral with the hub 40 and be a portion of the hub structure 14. However, the flange 601 may also be considered as a second-side covering 50Cs.

The first-side pressure ring 50Pf may be selected as a Belleville spring for example, and may be considered as a combined first-side cover and pressure ring 50CPf, or as a combined first-side cover, pressure, and friction ring 50CPFf.

With the embodiment 700, the assembly of the ring 50Pf and of the processing tool 20 on the hub 40 permits to controllably adjust a desired predetermined threshold torque or torque limit of transmission of rotation of the slip-clutch 10. The hub 40 may also support additional pressure rings 50P, and if the pressure rings are Belleville springs for example, nested pressure rings or pressure rings disposed face to face. The processing device 60 may have a hub structure 14 and a slip clutch 10 with a clutch mechanism 12 including a hub 40 configured to support at least one pressure ring 50P disposed in concentricity therewith and with the processing tool 20. The at least one pressure ring 50P, and optional additional rings 50, may be disposed on either one of both sides of the processing tool 20, namely the first side 22f or the second side 22s, or on both sides of the processing tool. Thereby, the at least one pressure ring 50P, the hub 40 and the processing tool 20 form a slip clutch 10 which is integrally embedded in the processing tool 20. The hub 40 may also support in addition, one or more rings 50 such as pressure rings 50P, friction rings 50F, jacket rings 50J, shim rings 50SH, combination rings 50K, such as pressure and friction rings 50PF, combined cover and friction rings 50CF, and combined cover, pressure, and friction rings 50CPF.

For further control and adjustment of the desired predetermined threshold torque, one or more rings 50 may be fixedly attached to each other, or be fixedly attached, or be engaged in rotation but axial freedom, relative to the hub 40, to provide one or more friction surfaces FRSR.

For axial assembly of the processing device 60 of the embodiment 700, the central opening 20CB of the processing tool 20 may be centered on the hub 40 and the processing tool second side 22s is then disposed on and in concentricity with the flange 601 of the hub 40. Thereafter, the first-side cover ring 50Cf, or first-side combined cover and pressure ring 50CPf, or first-side combined cover, pressure and friction ring 50CPFf may be centered on the hub 40 and be disposed on the processing tool first-side 22f. Finally, the central portion 602 of the first-side pressure ring 50Pf is compressed and seated onto the first-side circular flat 44f of the hub 40 and is fixedly attached thereto.

Thereby, the first-side pressure ring 50Pf is compressed from a free thickness Pt0 to a loaded and compressed thickness Pt, smaller than the thickness Pt0, as shown in FIG. 13A, and an axial friction fit is applied to the processing tool 20. As described hereinabove with respect to the embodiment 600, the hub height Ht, which is the distance between the second side 22s of the processing tool 20 and the first-side circular flat 44f of the hub 40, is calibrated. This calibration ensures a deflection of the first-side pressure ring 50Pf through an axial elastic compression deformation Δt, to provide the necessary axial interference fit allowing slippage of the processing tool 20 when a threshold torque limit is reached.

Operation of the Slip Clutch

With the processing device 60 of the embodiment 700, slippage may occur between the first-side pressure ring 50Pf and the processing tool first side 22f, and between the processing tool second side 22s and the flange 601 of the hub 40.

To accommodate the slippage threshold of the clutch mechanism 12, the exterior diameter 601od of the flange 601 may be smaller, equal, or larger than the exterior diameter 50Pod of the first-side pressure ring 50Pf. The operation of the slip clutch was described hereinabove in details, which is therefore not repeated.

The axial pressure exerted by the first-side pressure ring 20Pf against the flange 601 suffices to allow the rotational input provided by the rotating jaws 34 to rotate the processing tool 20. Nevertheless, when the friction forces exceed a predetermined torque threshold, the slip-clutch 10 allows slippage relative to the hub structure 14, between the first-side pressure ring 50Pf and the first side 22f of the processing tool 20, and between the second side 22s of the processing tool 20 and the flange 601. Such slippage may practically disconnect the rotative input to the processing tool 20, or may permit only partial and limited rotation input to the processing tool.

The predetermined threshold of transmission of rotation of the slip-clutch 10 may be controlled by at least one of the following: the axial force exerted by the first-side pressure ring 50Pf, the hub thickness Ht, and the coefficient of friction μ, in particular between the first-side pressure ring 50Pf, the processing tool 20 and the flange 601.

With the embodiment 700, the assembly of the first-side pressure ring 50Pf and of the processing tool 20 on the hub structure 14, permits to controllably adjust a desired predetermined threshold torque or torque limit of transmission of rotation of the slip-clutch 10.

The axial force exerted on the processing tool first-side 22f and on the flange 601 depends on the compression force exerted thereon by the first-side pressure ring 50Pf, and may be augmented by the clamping force of the jaws 34. This compression force depends on the hub thickness Ht. Taking the thickness 20t of the processing tool 20 into consideration, it is thus the appropriate selection and mutual adaptation of the hub thickness Ht, of the material and of the coefficient of elasticity c of the first-side pressure ring 50Pf that may be associated in the definition of the predetermined threshold of slip of the clutch 10.

Therefore, the hub thickness Ht, which determines the axial compression strain distance Δt, is one of the parameters, or arguments, defining the controllable torque threshold, or slip threshold of the slip clutch 10. The coefficient of elasticity c of the first-side pressure ring 50Pf is another one of the parameters, or arguments, defining the controllable torque threshold. It is the axial compression strain deformation distance of the first-side pressure ring 50Pf times the coefficient of elasticity c thereof that create the axial force on the processing device 60. Evidently, other parameters may include the coefficient of friction μ of the first-side pressure ring 50Pf of the processing tool 20, and of the flange 601, such as the exterior diameter of the first-side pressure ring and of the flange 601, as well as the elastic deflection thereof. It is noted that the first-side pressure ring 50Pf may also be considered as being operative a first-side friction ring 50Ff, or as a first-side cover ring 50Cf, or as a combination ring 50K, thus as a combination of two or more rings out of the group of cover, pressure, and friction rings. For example, the first-side pressure ring 50Pf may also be considered as being a combined first-side pressure and friction ring 50PFf, or as a first-side combined pressure and cover ring 50PCf, or as a first-side combined cover, pressure, and friction ring 50CPFf.

Embodiment 800

Figure 16:
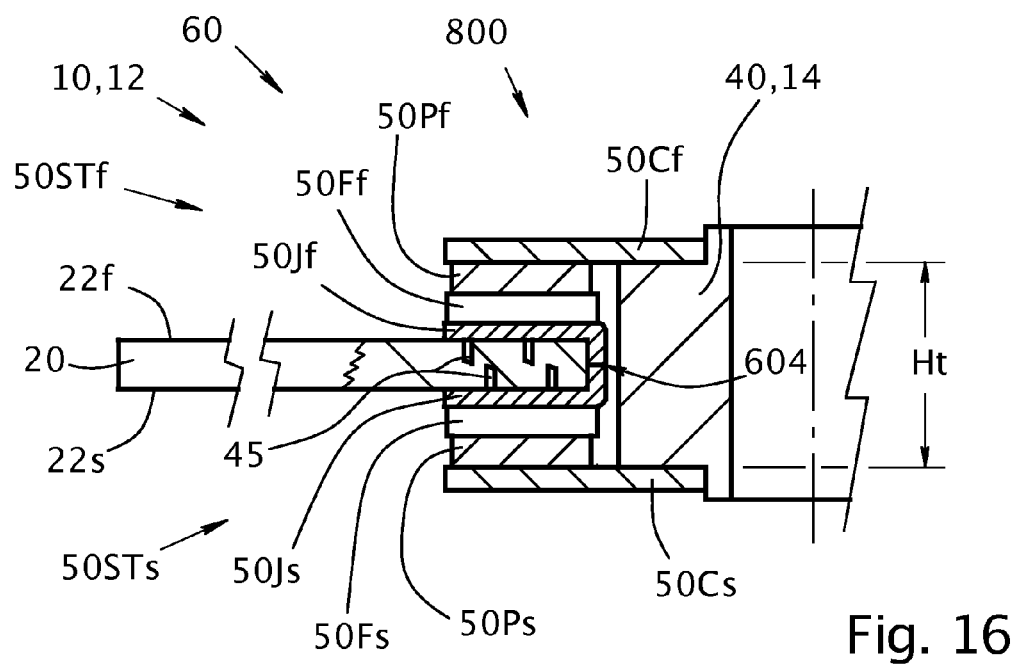

FIG. 16 depicts a partial cross-section of an additional exemplary embodiment 800 having a hub structure 14 and jacket rings 50J, where a first-side jacket ring 50Jf is disposed on the processing tool first side 22f and a second-side jacket ring 50Js is disposed on the processing tool second-side 22s.

Figure 16A:
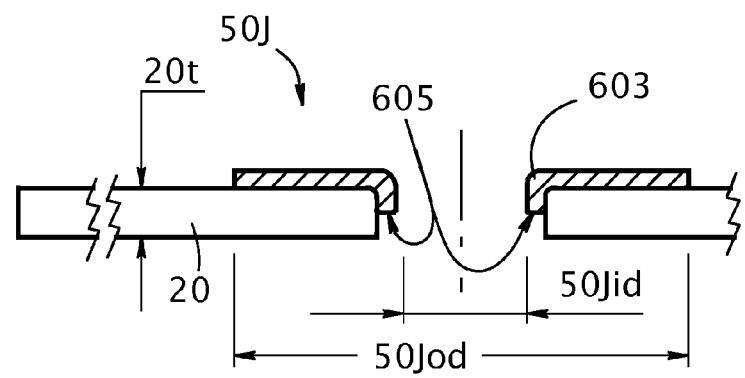
FIG. 16A shows a detail of the embodiment 800.

FIG. 16A depicts a jacket ring 50J having a jacket ring interior diameter 50Jid, which is smaller than the interior diameter of the central opening 20CB of the processing tool 20. The central portion 603 of the jacket ring 50J has an interior edge 605 that enters into the central opening 20CB and is bent over a portion of the thickness 20t of the processing tool 20. The central portion 603 of the first side jacket ring 50Jf and of the second side jacket ring 50Js may join each other, completely or partially, as shown in FIG. 16, at a mutual circular meeting edge 604 formed by meeting of their interior edge 605 in the interior of the central bore opening 20CB. Care is taken for the jacket rings 50J to remain in free rotational fit relative to the hub 40.

The jacket ring 50J may be mechanically coupled to the processing tool 20, say by adhesive or by mechanical fastening means for example. It is possible to use mechanical jacket fasteners 45, such as screws, or pins, or rivets for example, to fixedly couple between the jacket ring 50J and the processing tool 20. Such a mechanical jacket fastener 45 may be introduced perpendicular into the jacket ring 50J and into the processing tool 20. Other mechanical jacket fastener means may include cold fastening techniques, or fastening by mutual embossment of material.

A jacket ring 50J may operate as a friction ring 50F, which provides protection to the processing tool 20. If desired, the two jacket rings 50J may be coupled together at their interior edge 605 for example, by welding, brazing, or soldering together at the meeting edge 604. A jacket ring 50J may be considered as being an integral portion of the processing tool 20.

In FIG. 16, two sets of rings 50ST are disposed in mirroring symmetry on both sides 22 of the processing tool 20. A first-side set of rings 50STf is disposed on the processing tool first-side 22f, and a second-side set of rings 50STs is disposed on the processing tool second side 22s. The sets of rings 50ST are the same as those described hereinabove with respect to the embodiment 300, but are disposed on and in addition to the jacket rings 50J. Therefore, further description is not provided.

Assembly of the embodiment 800 is similar to the axial assembly procedures described hereinabove in relation to the embodiments 100 and 700.

Operation and use of the embodiment 800 are alike the description hereinabove referring to the embodiment 300.

Embodiment 900

Figure 17:
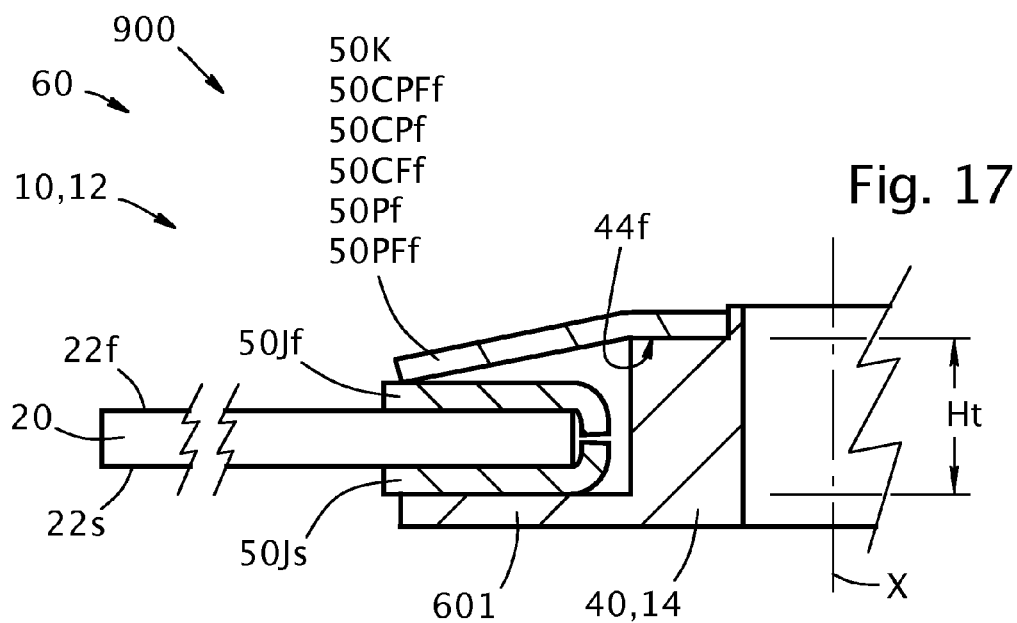
FIGS. 17 to 20 illustrate further embodiments, respectively 900 to 1200.

FIG. 17 shows a schematic partial cross-section of yet another exemplary embodiment 900 having a hub structure 14 and a processing tool 20 that is protected by jacket rings 50J. A first-side pressure ring 50Pf, or combined cover and pressure ring 50CPf, is disposed on the first-side jacket ring 50Jf, which partially covers the processing tool first-side 22f. The central portion of the pressure ring 50Pf is seated on and may be fixedly coupled to the hub 40, for example by attachment to the first-side circular flat 44f.

The flange 601 of the hub 40 supports the second-side jacket ring 50Js, which is disposed on the processing tool second-side 22s. With the jacket rings 50J being considered as integrally embedded in the processing tool 20, the embodiment 900 is similar to the embodiment 700.

Assembly, operation, and use of the embodiment 900 is similar to the description hereinabove referring to the embodiment 700.

Embodiment 1000

Figure 18:
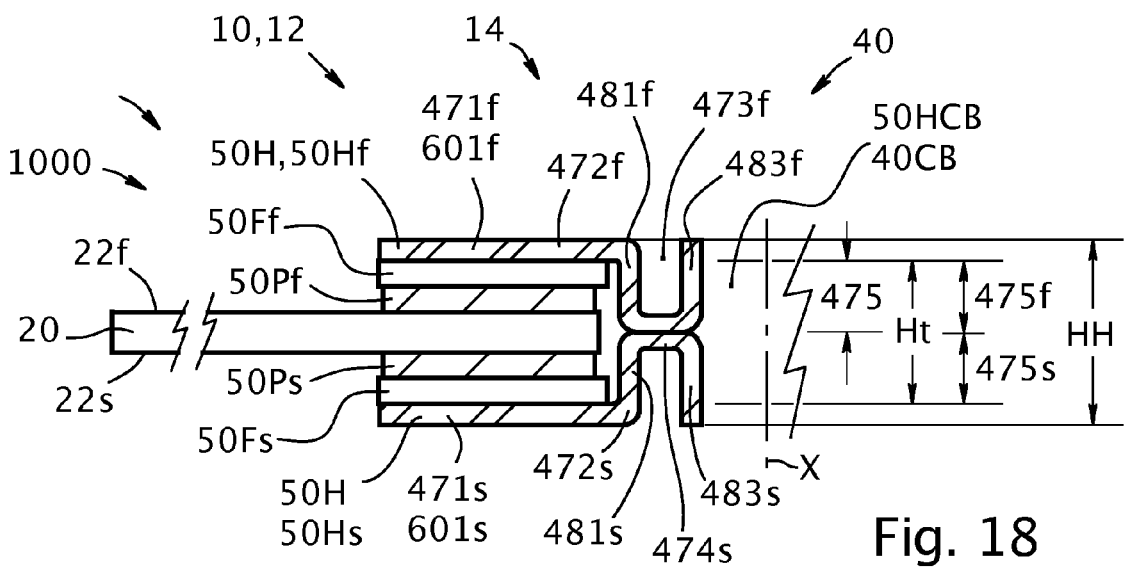

FIG. 18 depicts a schematic partial cross-section of still yet one more exemplary embodiment 1000 having a hub structure 14 forming a hub 40. The hub 40 may be assembled out of two identical hub rings 50H, namely a first-side hub ring 50Hf that is disposed in mirroring symmetry to a second-side hub ring 50Hs. The hub rings 50H have a peripheral hub portion 471 forming a flat ring, which may be regarded as the flange 601 of a hub 40. A hub central portion 472 of the hub ring 50H may be configured as a circular channel 473 delimited by an exterior wall 481 and by an interior wall 483. The exterior wall 481 defines the hub exterior surface and the interior wall 483 forms the hub central opening 50HCB, which is also the hub central opening 40CB having an interior diameter 40id. The circular channel 473 has a channel bottom 474 with a calibrated interior height 475. When two such hub rings 50H are concentrically joined together in mirroring symmetry by their channel bottom 474, they form a hub structure 14 or a hub 40 looking as a sheave or as a grooved wheel, or as a pulley. The hub structure 14 forms a hub 40 with a calibrated total interior height Ht and a total exterior height HH.

Figure 21:
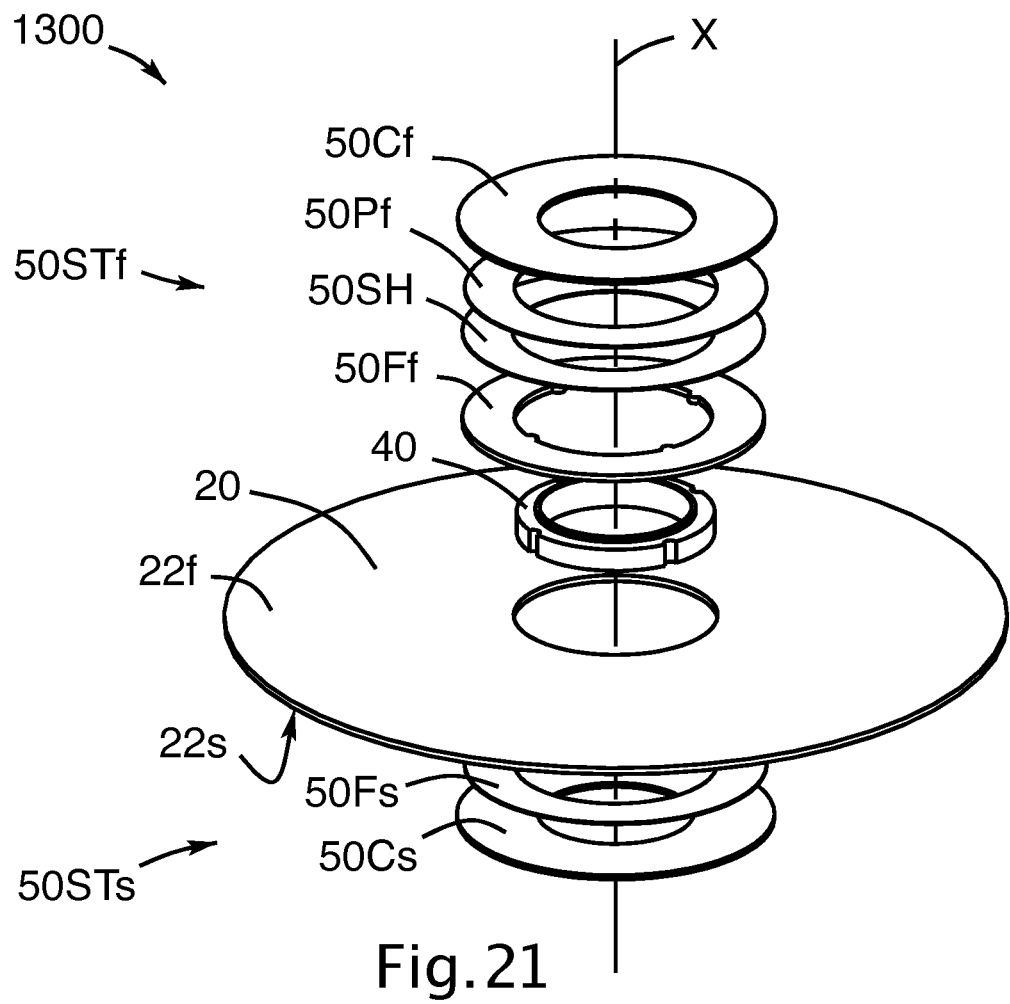
FIG. 21 is an exploded view of an embodiment 1300.

It is noted that shims, such as for example shim rings 50SH, shown in FIG. 21, may be used for adjustment and calibration purposes to obtain the desired hub thickness Ht or to maintain the desired axial elastic strain deformation Δt. For example, a shim ring 50SH may be disposed on a circular hub flat 44, or on a first-side, or on a second side, or on both sides of a processing tool 20, or in a set of rings 50ST. Such a shim ring 50SH may be made of metal, or even out of paper, or out any appropriate material. Where suitable, shim rings 50SH may be used with the various embodiments of the present invention.

The hub rings 50H may be considered as rings 50, having a portion that is operative as cover rings 50C, or as combination cover and friction rings 50CF, forming a hub structure 14. It is thus possible to regard the peripheral hub portions 471, or flanges 601 of the hub rings 50H, as being cover rings 50C that may operate as friction rings 50F. Alternatively, the hub rings 50H may be considered as portions of an assembly forming a hub structure 14 having a hub 40 with flanges 471, or 601, operative as cover rings 50C.

The hub rings 50H may be implemented out of suitable material such as for example sheet metal, plastic, or a selected artificial substance. Fixedly attaching together of the channel bottom 474 of hub rings 50H may be achieved by use of adhesive, by welding, and by mechanical fastening, by snap fit, or by joining and fastening methods appropriate for the materials from which the hub rings 50H are made, which joining methods are well known to those skilled in the art.

FIG. 18 illustrates an example of an assembled processing device 60. The processing tool first-side 22f concentrically supports a first-side pressure ring 50Pf, on which is disposed a first-side friction ring 50Ff that in turn, is covered by the first-side hub ring 50Hf. The same types of rings 50 are disposed on the second-side, in mirroring symmetry relative to the first-side 22f of the processing tool 20.

In assembly, the second-side friction ring 50Fs is disposed on the flange 601 of the second-side hub ring 50Hs, such that the bottom 474 thereof protrudes out of the interior diameter 50Fid, shown in FIG. 6. The same is repeated with the second-side pressure ring 50Ps. Then, the processing tool 20 is centered on the second-side pressure ring 50Ps. Next, on the processing tool first-side 22f, the first-side pressure ring 50Pf, and the first-side friction ring 50Ff are disposed in sequence and in concentricity with the processing tool 20. Thereafter, the first-side hub ring 50f is centered in concentricity with the second-side hub ring 50Hs. In a further step, pressure is applied on the hub rings 50 for the hub ring bottoms 474 to meet in abutment and to compress the pressure rings 50P from their free or uncompressed thickness Pt0 to their loaded or compressed thickness Pt. In a final step of assembly, the hub ring bottoms 474 are fixedly attached coaxially to each other, by means well known to those skilled in the art.

The slip clutch 10 is thereby assembled to slip at the predetermined threshold torque limit. The sum of the calibrated interior heights 475 of the hub rings 50H is the total interior height Ht, which determines the predetermined friction fit compression elastic strain deformation Δt. The slip clutch 10 is thereby assembled to slip at the predetermined threshold torque limit.

If desired, the interior height 475 of the first-side hub ring 50Hf and of the second-side hub ring 50Hs, shown in FIG. 18, may differ from each other, but their total interior height has to sum up to the calibrated interior height Ht to ensure the proper axial friction fit elastic strain deformation Δt.

With the embodiment 1000, the assembly of rings 50 and of the processing tool 20 with the hub structure 14 permits to controllably adjust a desired predetermined torque limit of transmission of rotation of the slip-clutch assembly 10. A processing device 60 with a slip-clutch assembly 10 is operational when configured with two hub rings 50H, namely 50Hf and 50Hs, and the processing tool 20.

Use and operation of the processing device 60 of the embodiment 1000 is not different from the description provided hereinabove for the embodiment 100, and is therefore not repeated.

The embodiment 1000 having hub rings 50H permits to controllably adjust a desired predetermined threshold torque or torque limit of transmission of rotation of the slip-clutch 10. If desired, it is possible to add additional rings 50 to the embodiment 1000.

Embodiment 1100

Figure 19:
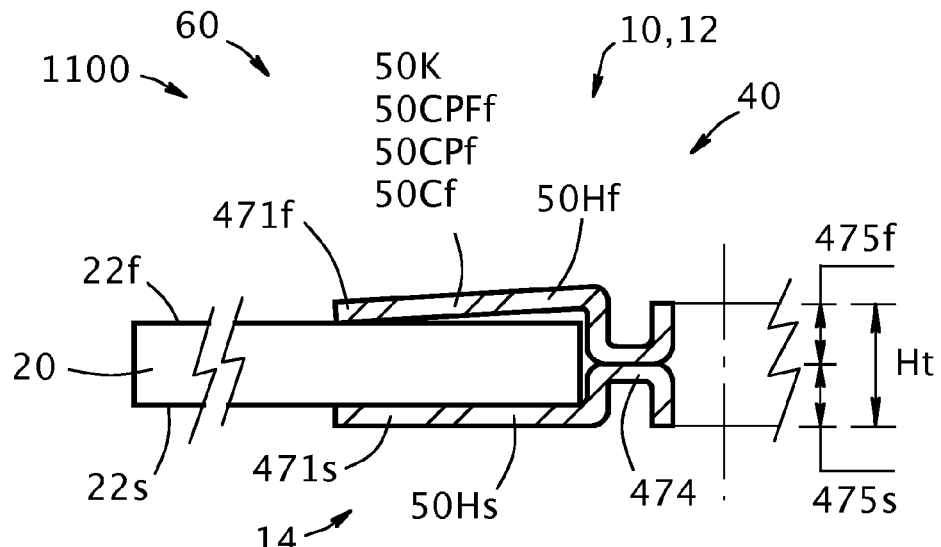

FIG. 19 depicts a schematic partial cross-section of still yet one more exemplary embodiment 1100, having a hub structure 14 forming a hub 40 somewhat similar to the hub structure 14 of the embodiment 1000. The hub structure 14 may be assembled out of two hub rings 50H, namely a first-side hub ring 50Hf and a second-side hub ring 50Hs, which may be identical to the second-side hub ring 50Hs of the embodiment 1000.

The first-side peripheral hub portion 471$f$ of the hub ring 50Hf may be configured as a combination ring 50K operative as a cover ring 50Cf as a pressure ring 50Pf, and as a friction ring 50Ff, thus as a combined cover-and pressure ring 50CPf.

The second-side peripheral hub portion 471$s$ may be configured as the first-side peripheral hub portion 471$f$ and be disposed in mirroring symmetry thereto, or be configured as a cover ring 50Cs which is disposed on the second-side 22$f$ of the processing tool 20. After assembly, the predetermined height is obtained between the exterior periphery of the first-side and the second-side hub portions 50H, respectively 471$f$ and 471$s$.

In FIG. 19, the first-side hub ring 50Hf is configured such that the circumference of the first-side peripheral hub portion 471$f$ may operate as a compression spring or compression ring 50Pf when assembled to the second-side hub ring 50Hs. The interior heights 475$f$ and 475$s$ of both hub rings 50H is calibrated to ensure an interior height Ht once both the first-side hub ring 50Hf and the second-side hub ring 50Hs are joined together coaxially by their channel bottom 474. The height Ht is the distance that provides the predetermined axial compression friction fit elastic strain deformation Δt. The slip clutch 10 is thereby properly assembled to slip at the predetermined threshold torque limit.

Assembly of the embodiment 1100 is straightforward. The final step of assembly calls for the hub ring bottoms 474 to be fixedly attached to each other, whereby the height Ht is provided.

The processing device 60 may thus be implemented as an assembly of a hub structure 14 with a processing tool 20, by which the assembly inherently forms a slip clutch 10 that is integrally embedded in the processing device.

Use and operation of the processing device 60 of the embodiment 1100 is not different from the description provided hereinabove for the embodiment 100, and is therefore not repeated.

The embodiment 1100 having hub rings 50H permits to controllably adjust a desired predetermined threshold torque or torque limit of transmission of rotation of the slip-clutch 10. If desired, it is possible to add additional rings 50 to the embodiment 1000.

Embodiment 1200

Figure 20:
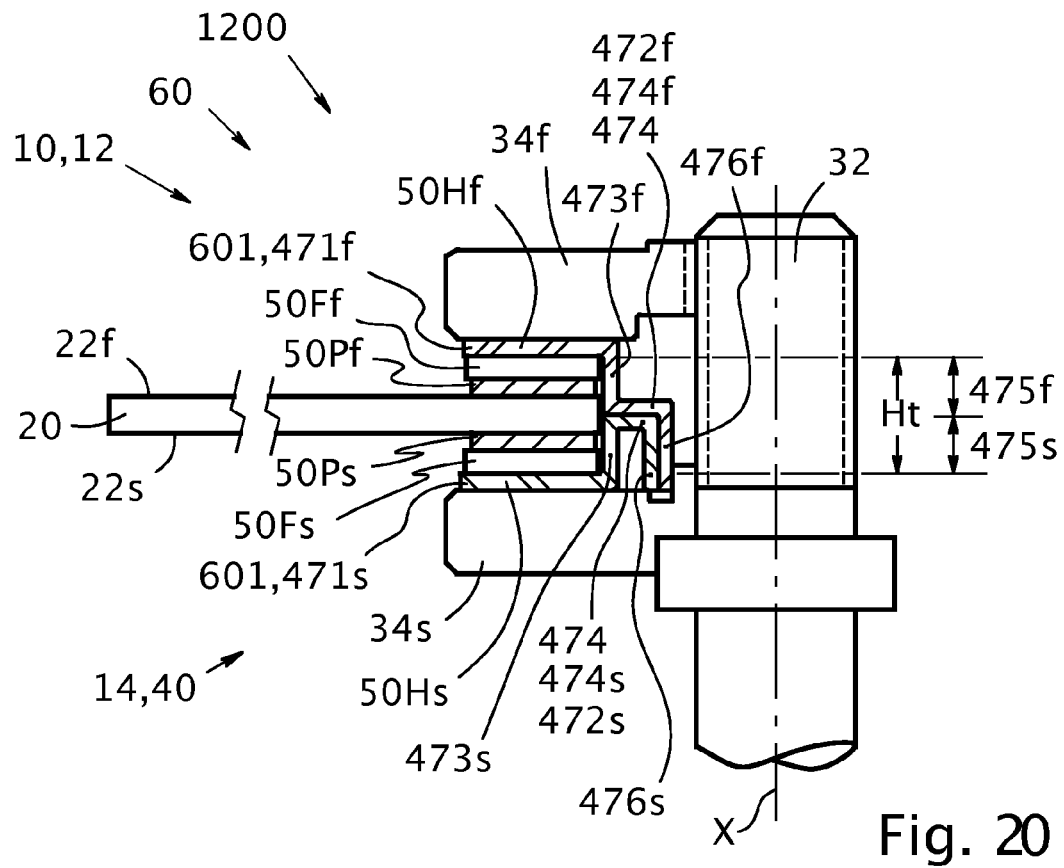

FIG. 20 depicts a schematic partial cross-section of still yet one more exemplary embodiment 1200, having a hub structure 14 forming a hub 40 similar to but with a hub ring central portion 471 slightly different from the hub structure of the embodiment 1000.

The second-side hub ring 50Hs of the embodiment 1200 may be the same as the second-side hub ring 50Hs of the embodiment 1000, but not so for the first-side hub ring 50Hf. Instead of the circular open channel 473 of the first-side hub ring 50Hf of the embodiment 1000, the channel bottom 474$f$ of the embodiment 1200 nests-over the channel bottom 474$s$ of the second-side hub ring 50Hs. This means that the interior nesting-over channel wall 476$f$ of the first-side hub ring 50Hf now covers the nested-in interior wall 476$s$ of the second-side hub ring 50Hs and that the channel bottom 474$f$ of the first-side hub ring 50Hf covers the channel bottom 474$s$ of the second-side hub ring 50$s$.

The two channel bottoms 474 are fixedly joined together to form the hub structure 14. The hub central portion 472 of both hub rings 50H is calibrated so that when fixedly nested-in and joined together, the height 475$f$ of the first-side hub ring 50Hf and the height 474$s$ the second-side hub ring 50Hs add up to the height Ht, which is the distance for providing the predetermined axial compression friction fit elastic strain deformation Δt. The slip clutch 10 is thereby configured to slip at the predetermined threshold torque limit.

Both hub rings 50H form the hub structure 14 that ensures proper coaxial centering of the processing device 60 with the power tool 30. Besides the central hub portion 471, the embodiment 1200 is not different from the embodiment 1000.

Features of the Embodiments

The features illustrated hereinabove for one specific embodiment may be used interchangeably and in combination with other described embodiments when appropriate.

The embodiments described hereinabove refer to an enhanced material-processing device 60 including a processing tool 20 of substantially circular circumference operative with a power tool 30 having a rotating spindle 32, and a clamping device, or clamping means, such as clamps 34, for coupling the processing tool 20 to the spindle. The processing tool 20 has an enlarged central opening 20CB entered concentrically therein for receiving at least a portion of the hub structure 14. In turn, the hub structure is coupled to the processing tool 20 to form a slip clutch 10 integrally embedded therein, where the slip clutch is configured to slip relative to the rotating spindle 32 when the processing tool reaches a threshold torque limit.

The slip clutch 10 includes a clutch mechanism 12 that is preloaded in predetermined axial compression elastic strain deformation Δt, and is configured to apply a selected axial interference pressure fit on the processing tool 20.

The hub structure 14 may be configured as at least one sleeve, or as one unitary piece of material or as an assembly made of a plurality of machine parts, and is coaxial with the central opening 20CB of the processing tool 20.

At least one pressure ring 50P may be disposed on the first side 22f, or on the second side 22s, or on both sides of the processing tool 20. In such a manner, the at least one pressure ring 50P, the hub structure 14 the processing tool 20, and the clamps 34, form a slip clutch 10 integrally embedded in the processing tool.

The slip clutch 10 may include one or more rings 50 that may be selected from a group of rings including cover rings 50C, pressure rings 50P, friction rings 50F, jacket rings 50J, hub rings 50H, 50SH and rings 50K forming combination rings, and the ring(s) 50 is/are concentric to the hub 40 and to the spindle 32, and are disposed on a first side 22f, or on a second side 22s, or on both sides of the processing tool 20. The rings 50 may be configured as an annulus, or washer having an interior circular opening concentric with an exterior circular circumference. Alternatively, the rings 50 may be configured as axisymmetric rings with protrusions departing from a circular periphery, such as teeth for example. Such teeth, may protrude radially toward the center of the interior diameter of the ring 50, and/or radially outward and away from the exterior circumference of the ring. Moreover, a ring 50 is not necessarily flat, but a circular protrusion extending axially thereout may determine a radius of contact with an adjacent ring 50 or with the processing tool 20. It is noted that the axial direction is defined by the axis of the spindle 32, which axis is perpendicular to the rings 50 and to the processing tool 20.

A plurality of, or one pressure ring 50P may be fixedly coupled to the hub 40, or be engaged therewith in rotational coupling but in free axial displacement, or be coupled to the processing tool 20, and/or to one or more a ring(s) 50 out of the group of rings and be preloaded to maintain a predetermined axial pressure on the processing tool 20. The clamping jaws 34 of the power tool 30 clamp the processing device 60 in axial compression and redress lacking, lost, or missing predetermined axial pressure fit on the processing tool 20 departing from the desired axial elastic strain deformation Δt.

The at least one pressure ring 50P may be loaded in predetermined axial compression to apply an axial interference pressure fit on the processing tool.

The at least one cover ring 50C is fixedly coupled to the hub structure 14, which may support either a cover ring that is also operative as a pressure ring 50P, or a couple of cover rings configured to compress the processing tool 20 therebetween.

An enhanced processing device 60 is operative with a power tool 30 having a rotating spindle 32 that retains and rotates a processing tool 20 of substantially circular circumference, where a central opening 20CB is entered concentrically in the processing tool. Furthermore, a hub structure 14 is configured to be disposed in the central opening 20CB and coupled to the processing tool 20 in integral embedment therein.

The enhanced material-processing device 60 may have a hub structure 14 that is configured to support at least one ring 50, which is disposed in concentricity therewith and with the processing tool 20. The at least one ring 50 may be selected alone and in combination out of cover rings 50C, pressure rings 50P, friction rings 50F, jacket rings 50J, hub rings 50H, and combination rings 50K. Furthermore, the at least one ring 50 may be disposed on a first side 22f, or on a second side 22s, or on both sides of the processing tool 20.

Features of the various embodiments described hereinabove may be combined when appropriate. For example, the radial geometric engagement of a ring 50 with the hub 40 as shown in FIG. 6A, may be implemented with friction rings 50F, and is not restricted to the embodiment 100, but different mechanisms may have to be implemented with the embodiments 1000 and 1200. The shim rings 50SH are another example of an adjustment ring operative for different embodiments described hereinabove. Furthermore, and also applicable with the various embodiments described hereinabove, the torque limit threshold is controllable and pre-adjustable according to requirements.

FIG. 21 is an exploded view of an embodiment 1300 showing two sets of rings: a first-side set of rings 50STf and a second-side set of rings 50STs aligned with an axis X of the spindle 32, which is not shown. The first-side set of rings 50STf includes a shim ring 50SH that is disposed on the side of the processing tool first side 22f. The first-side set of rings 50STf has a first-side cover ring 50Cf, which is disposed on a first-side pressure ring 50Pf that is supported by a shim ring 50SH covering a first-side friction ring 50Ff. The first-side friction ring 50Ff abuts the processing tool first side 22f. The hub 40, described hereinabove with respect to FIG. 6A, is configured to radially engage the first-side friction ring 50Ff for rotation therewith, but to permit axial displacement of the first-side friction ring. The second-side set of rings 50STs has a second-side friction ring 50Fs disposed proximal to the processing tool 20 and a second-side cover ring 50s disposed distally away from the processing tool.

A method is described hereinabove for implementing a slip clutch 10 integrally embedded in a material-processing processing device 60 including a processing tool 20 of substantially circular circumference operating with a power tool 30 having a rotating spindle 32. The method comprises providing a concentric central opening 20CB in the processing tool 20 for receiving therein at least a portion of a clutch mechanism 12, and for forming the clutch mechanism by providing a hub structure 14 disposed at least in portion in the central opening and applying a predetermined axial compression friction fit on the processing tool 20. The method further comprises allowing the processing tool 20 to slip relative to the rotating spindle 32 when a torque limit threshold is reached.

The method further comprises providing at least one ring 50 selected alone and in combination out of rings including cover rings 50C, pressure rings 50P, friction rings 50F, jacket rings 50J, hub rings 50H, shim rings 50SH, and combination rings 50K. Furthermore, the method comprises disposing the at least one ring 50 in concentricity to the hub 40 on a first side 22f, on a second side 22s, or on both sides of the processing tool 20.

The enhanced material-processing device 60 is configured for repeated use but is a disposable device, to be thrown away, after use, together with the slip clutch 10 that is integrally embedded therein.

The enhanced material-processing device 60 is configured as a readily exchangeable replacement for a standard existing processing tool 19 to be mounted by the user in the same manner as on an available power tool 30 and to be clamped between the jaws 34 thereof.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiments have been described to a certain degree of particularity, it should be understood that various alterations and modifications could be made without departing from the scope of the invention as hereinafter claimed.

INDUSTRIAL APPLICABILITY

The embodiments described hereinabove are configured for use in industries operating power tools to which substantially circular or wheel shaped tools are used, and for use by manufactures of processing tools 20. The device and the method described hereinabove are applicable to the tool-producing industry and may be used for material processing purposes with hand-held rotating tools as well as with stationary rotating tools.

REFERENCE SIGNS LIST

Δt axial elastic strain deformation
f first side
c coefficient of elasticity
s second side
FRSR friction surface
Ht hub thickness
HH total exterior height of hub of hub rings 50H
X axis of the spindle 32
10 slip-clutch
12 clutch mechanism
14 hub structure
19 standard off-the-shelf processing tool
20 material processing tool
20t processing tool thickness
20CB central opening
21 center portion of processing tool
22 processing tool side
   22f processing tool first side
   22s processing tool second side
25 central bore
30 power tool
32 spindle
34 jaws
   34f first-side jaw
   34s second-side jaw
35 jaw protrusion
40 hub 40
   40f first side of hub
   40s second side of hub
   40id hub interior diameter
   40od hub exterior diameter
40A first hub sleeve
40B second hub sleeve
40C hub sleeve
40D hub sleeve
40E central hub sleeve
40F hub sleeve
40CB hub central opening
41 axial hub indentation
44 circular hub flats
   44f first-side circular flat
   44s second-side circular flat
45 mechanical jacket fastener
46 hub protrusions
   46f first-side hub protrusion
   46s second-side hub protrusion
   46od protrusions exterior diameter
47 hub exterior surface
48 swaged hub coupling
   48f first-side swaged hub coupling
   48s second-side swaged hub coupling
50 ring
50C cover ring
   50Cf first-side cover ring
   50Cs second-side cover ring
   Ct cover ring thickness
50CF combined cover and friction ring
50CP combined cover and pressure ring
   50CPf first-side combined cover and pressure ring
   50CPs second-side cover and pressure ring
50CPF combined cover, pressure, and friction ring
50F friction ring
   50Ff first-side friction ring
   50Fs second-side friction ring
   50Fid
   50Fod
   Ft friction ring thickness
50H hub ring
   50Hf first-side hub ring
   50Hs second-side hub ring
50HCB hub ring central bore
50J jacket rings
   50Jf first-side jacket ring
   50Js first-side jacket ring
50K combination ring
50P pressure ring
   50Pf first-side pressure ring
   50Ps second-side pressure ring
   50Pid interior diameter of pressure ring
   50Pod exterior diameter of pressure ring
   Pt pressure ring thickness
50SH shim ring
50ST set of rings 50
   50STf first-side set of rings
   50STs second-side set of rings
51 ring tooth
57 ring interior periphery
60 enhanced material-processing device
100-1200 embodiments
201 recessed processing tool
   201f recessed processing tool first side
   201s recessed processing tool second side
202 central portion of 201
203 peripheral portion of 201
204 cup-like portion of 201
205 first plane
206 second plane
471 peripheral hub portion
472 hub central portion
473 circular open channel
474 channel bottom
   474f channel bottom of the first-side hub ring 50Hf
   474s channel bottom of the second-side hub ring 50Hs
475 channel bottom 474 with a calibrated interior height
476f nesting-over channel wall
476s nested-in interior wall
481f first exterior wall
481s second exterior wall
483f first interior wall
483s second interior wall
601 flange integral with the hub
601od external diameter of 601
602 central portion of the pressure ring 50P
603 central portion of the jacket ring
604 jacket meeting edge
605 interior edge

The invention claimed is:

1. A material-processing device which is operatively rotated by a rotating spindle of a power tool, the material-processing device comprising:
   a material processing tool which has a substantially circular circumference, and which has a central opening entered concentrically in the material processing tool, and
   a hub structure configured to be disposed in the central opening and coupled to the material processing tool to form a slip clutch in integral embedment therein,
   wherein the hub structure has a cylinder portion and upper and lower flange portions extending from both ends of the cylinder portion, the cylinder portion being received in the central opening of the material processing tool and the upper and lower flange portions extending radially outward over a partial area of the material processing tool so as to sandwich the material processing tool in the partial area and so as to extend from an inner circumferential edge of the central opening of the material processing tool toward an outer circumferential edge of the material processing tool.

2. The material-processing device of claim 1, wherein:
   the hub structure is configured to support at least one ring disposed in concentricity therewith and with the material processing tool,
   the at least one ring is selected from a group of rings consisting of cover rings, pressure rings, friction rings, jacket rings, hub rings, and combination rings, and
   the at least one ring is disposed on one of a first side, a second side, and both sides of the material processing tool.

3. The material-processing device of claim 1, wherein:
   both ends of the cylinder portion of the hub structure have step-like circular recesses that form parallel circular upper and lower hub flats,
   the upper and lower flange portions are fixedly attached to the upper and lower hub flats, respectively, and
   the hub structure further comprises first and second pressure rings and first and second friction rings that are concentric with the material processing tool and the hub structure, the first pressure ring and the first friction ring being disposed above the partial area of the material processing tool and between the material processing tool and the upper flange portion, and the second pressure ring and the second friction ring being disposed below the partial area of the material processing tool and between the material processing tool and the lower flange portion.

4. The material-processing device of claim 3, wherein the upper and lower flange portions are fixedly attached to the upper and lower hub flats by one of mechanical fastening, welding, brazing, soldering, and an adhesive.

5. The material-processing device of claim 1, wherein:
   the upper and lower flange portions are integrally formed with upper and lower ends of the cylinder portion, respectively, and
   the hub structure further comprises first and second pressure rings and first and second friction rings that are concentric with the material processing tool and the hub structure, the first pressure ring and the first friction ring being disposed above the partial area of the material processing tool and between the material processing tool and the upper flange portion, and the second pressure ring and the second friction ring being disposed below the partial area of the material processing tool and between the material processing tool and the lower flange portion.

6. A material-processing device operative with a rotating spindle of a power tool via clamps for clamping the material-processing device therebetween, the material-processing device comprising:
   a hub structure; and
   a material processing tool which has a substantially circular circumference and which has a central opening entered concentrically in the material processing tool for receiving the hub structure,
   wherein the hub structure is coupled to the material processing tool to form a slip clutch integrally embedded in the material processing tool so that the material processing tool is configured to slip relative to the hub structure when a threshold torque limit is reached, and
   wherein the hub structure has a cylinder portion and upper and lower flange portions extending from both ends of the cylinder portion, the cylinder portion being received in the central opening of the material processing tool and the upper and lower flange portions extending radially outward over a partial area of the material processing tool so as to sandwich the material processing tool in the partial area and so as to extend from an inner circumferential edge of the central opening of the material processing tool toward an outer circumferential edge of the material processing tool.

7. The material-processing device of claim 6, wherein the slip clutch is preloaded in predetermined axial compression elastic strain deformation and is configured to apply a selected axial interference pressure fit on the material processing tool.

8. The material-processing device of claim 6, wherein the hub structure is configured as at least one piece of material.

9. The material-processing device of claim 6, wherein:
   the hub structure has a hub and is configured to support at least one pressure ring disposed coaxially therewith and with the material processing tool, and
   the at least one pressure ring is disposed on one of a first side, a second side, and both sides of the material processing tool, such that the at least one pressure ring, the hub and the material processing tool form the slip clutch integrally embedded in the material processing tool.

10. The material-processing device of claim 9, wherein the hub structure is coaxial with the central opening of the material processing tool.

11. The material-processing device of claim 9, wherein the at least one pressure ring is preloaded to apply a predetermined axial pressure fit on the material processing tool.

12. The material-processing device of claim 11, wherein the clamps are clamped on the material processing tool to redress a loss of the predetermined axial pressure fit.

13. The material-processing device of claim 6, wherein:
   the hub structure is configured to support at least one ring selected from a group of rings consisting of cover rings, pressure rings, friction rings, jacket rings, hub rings, and combinations rings, and
   the at least one ring is concentric to a hub of the hub structure and is disposed on one of a first side, a second side, and both sides of the material processing tool.

14. The material-processing device of claim 13, wherein at least one pressure ring is fixedly attached to at least one of:

the hub,
the material processing tool, and
a ring selected out of the group of rings.

15. The material-processing device of claim 6, wherein:
both ends of the cylinder portion of the hub structure have step-like circular recesses that form parallel circular upper and lower hub flats,
the upper and lower flange portions are fixedly attached to the upper and lower hub flats, respectively, and
the hub structure further comprises first and second pressure rings and first and second friction rings that are concentric with the material processing tool and the hub structure, the first pressure ring and the first friction ring being disposed above the partial area of the material processing tool and between the material processing tool and the upper flange portion, and the second pressure ring and the second friction ring being disposed below the partial area of the material processing tool and between the material processing tool and the lower flange portion.

16. The material-processing device of claim 15, wherein the upper and lower flange portions are fixedly attached to the upper and lower hub flats by one of mechanical fastening, welding, brazing, soldering, and an adhesive.

17. The material-processing device of claim 6, wherein:
the upper and lower flange portions are integrally formed with upper and lower ends of the cylinder portion, respectively, and
the hub structure further comprises first and second pressure rings and first and second friction rings that are concentric with the material processing tool and the hub structure, the first pressure ring and the first friction ring being disposed above the partial area of the material processing tool and between the material processing tool and the upper flange portion, and the second pressure ring and the second friction ring being disposed below the partial area of the material processing tool and between the material processing tool and the lower flange portion.

* * * * *